United States Patent
Pennington et al.

(10) Patent No.: US 11,802,052 B2
(45) Date of Patent: *Oct. 31, 2023

(54) APPARATUS AND METHOD FOR PLASMA SYNTHESIS OF GRAPHITIC PRODUCTS INCLUDING GRAPHENE

(71) Applicant: Levidian Nanosystems Limited, Cambridge (GB)

(72) Inventors: Dale Andrew Pennington, Cambridge (GB); Aaron Robert Clayton, Cambridge (GB); Katarzyna Luiza Juda, Cambridge (GB); Catharina Paukner, Cambridge (GB); Lukasz Kurzepa, Cambridge (GB); Robert Henry St. John Cooper, Cambridge (GB); Krzysztof Kazimierz Koziol, Cambridge (GB); Jerome Yi-Zhe Joaug, Cambridge (GB)

(73) Assignee: LEVIDIAN NANOSYSTEMS LIMITED, Cambridge (GB)

( * ) Notice: Subject to any disclaimer, the term of this patent is extended or adjusted under 35 U.S.C. 154(b) by 518 days.

This patent is subject to a terminal disclaimer.

(21) Appl. No.: 15/318,377

(22) PCT Filed: Jun. 12, 2015

(86) PCT No.: PCT/GB2015/051745
§ 371 (c)(1),
(2) Date: Dec. 13, 2016

(87) PCT Pub. No.: WO2015/189643
PCT Pub. Date: Dec. 17, 2015

(65) Prior Publication Data
US 2017/0113935 A1    Apr. 27, 2017

(30) Foreign Application Priority Data
Jun. 13, 2014 (GB) .................................. 1410639

(51) Int. Cl.
*C01B 32/184* (2017.01)
*H05H 1/46* (2006.01)
(Continued)

(52) U.S. Cl.
CPC .......... *C01B 32/184* (2017.08); *B01D 46/023* (2013.01); *B01J 19/088* (2013.01);
(Continued)

(58) Field of Classification Search
CPC ...... B01J 19/126; B01J 19/129; B01J 19/088; B01J 2219/0869; B01J 2219/0892;
(Continued)

(56) References Cited

U.S. PATENT DOCUMENTS

| | | | |
|---|---|---|---|
| 5,349,154 A * | 9/1994 | Harker | H05H 1/46 219/121.41 |
| 6,099,696 A | 8/2000 | Schwob | |

(Continued)

FOREIGN PATENT DOCUMENTS

| | | |
|---|---|---|
| GB | 2490355 | 10/2012 |
| JP | H0483874 | 3/1992 |

(Continued)

OTHER PUBLICATIONS

WO 2005058755 A1—translation (Year: 2005).*
(Continued)

*Primary Examiner* — Nicholas A Smith
(74) *Attorney, Agent, or Firm* — Bookoff McAndrews, PLLC

(57) ABSTRACT

Apparatus and method are disclosed for plasma synthesis of graphitic products including graphene. A plasma nozzle is coupled to a reaction chamber. A process gas is supplied to the plasma nozzle, the process gas comprising a carbon-containing species. Radio frequency radiation is supplied to the process gas within the plasma nozzle, so as to produce (Continued)

a plasma within the nozzle in use, and thereby cause cracking of the carbon-containing species. The plasma nozzle is arranged such that an afterglow of the plasma extends into the reaction chamber. The cracked carbon-containing species also passes into the reaction chamber, and the cracked carbon-containing species recombines within the afterglow, so as to form the graphitic products including graphene.

9 Claims, 18 Drawing Sheets

(51) Int. Cl.
 B01J 19/12 (2006.01)
 B01J 19/08 (2006.01)
 B01D 46/02 (2006.01)
(52) U.S. Cl.
 CPC ........... *B01J 19/126* (2013.01); *B01J 19/129* (2013.01); *H05H 1/46* (2013.01); *B01J 2219/0869* (2013.01); *B01J 2219/0875* (2013.01); *B01J 2219/0892* (2013.01); *C01B 2204/04* (2013.01); *H05H 1/4622* (2021.05)
(58) Field of Classification Search
 CPC ............ B01J 2219/0875; C01B 32/184; C01B 32/20; C01B 2204/04; C01B 32/186; C01B 32/154; C01B 2204/02; H05H 1/46; H05H 2001/4622; C23C 16/26; B01D 46/02; B01D 46/023
 USPC .......................... 204/157.43, 157.44, 157.47
 See application file for complete search history.

(56) References Cited

U.S. PATENT DOCUMENTS

| | | | | |
|---|---|---|---|---|
| 7,771,666 | B2* | 8/2010 | De La Veaux | B01J 19/088 422/129 |
| 8,071,906 | B2* | 12/2011 | Smiljanic | B01J 19/088 118/723 R |
| 9,221,688 | B2* | 12/2015 | Hung | B82Y 30/00 |
| 2002/0151604 | A1* | 10/2002 | Detering | B01J 19/088 518/703 |
| 2004/0262145 | A1* | 12/2004 | Duzhev | B01J 19/088 422/186.04 |
| 2006/0006153 | A1* | 1/2006 | Lee | H05H 1/46 219/121.5 |
| 2007/0280863 | A1* | 12/2007 | Wira | B01J 19/088 422/151 |
| 2008/0056928 | A1* | 3/2008 | Bunce | C09C 1/3684 419/36 |
| 2009/0214799 | A1* | 8/2009 | Simard | B82Y 30/00 977/843 |
| 2010/0072430 | A1* | 3/2010 | Gergely | H01F 1/0054 204/157.63 |
| 2010/0301212 | A1 | 12/2010 | Dato et al. | |
| 2010/0314788 | A1 | 12/2010 | Hung et al. | |
| 2012/0034137 | A1* | 2/2012 | Risby | H01J 37/32357 422/186.29 |
| 2012/0090982 | A1 | 4/2012 | Fullerton et al. | |
| 2013/0022530 | A1* | 1/2013 | Mercuri | B82Y 40/00 977/842 |
| 2014/0030447 | A1 | 1/2014 | Lee et al. | |
| 2014/0045342 | A1 | 2/2014 | Mallick et al. | |
| 2014/0159572 | A1 | 6/2014 | Risby et al. | |
| 2014/0219906 | A1* | 8/2014 | Kim | C01B 32/194 423/439 |
| 2015/0098877 | A1* | 4/2015 | Hendricksen | B01D 53/83 422/143 |
| 2015/0129544 | A1* | 5/2015 | Davis | H01B 13/0026 427/122 |
| 2016/0217979 | A1* | 7/2016 | Kim | H01J 37/32192 |
| 2019/0006151 | A1* | 1/2019 | Paukner | B01J 19/088 |

FOREIGN PATENT DOCUMENTS

| | | | | |
|---|---|---|---|---|
| JP | 2006247446 | | 9/2006 | |
| JP | 2013-040151 | A | 2/2013 | |
| KR | 10-2007-0099536 | A | 10/2007 | |
| KR | 20100110216 | | 10/2010 | |
| KR | 1020110055946 | | 12/2012 | |
| WO | 03062146 | | 7/2003 | |
| WO | WO-2005058755 | A1 * | 6/2005 | ............. B82Y 30/00 |
| WO | 2010094969 | | 8/2010 | |
| WO | 2010094972 | | 8/2010 | |
| WO | 2012147054 | | 11/2012 | |
| WO | 2013049498 | | 4/2013 | |

OTHER PUBLICATIONS

United Kingdom Search Report in counterpart patent application No. GB1510364.1 dated Jun. 25, 2015.
International Search Report in counterpart patent application No. PCT/GB2015/051745 dated Aug. 19, 2015.
Novoselov, K. S. et al., Nature, a roadmap for graphene, vol. 490, pp. 192-200, Oct. 2012.
Segal, M., Nature Nanotechnology, Selling graphene by the ton, vol. 4, pp. 612-614, Oct. 2009.
Subrahmanyam, K. S. et al., The Journal of Physical Chemistry C Letters, Simple method of preparing graphene flakes by an arc-discharge method, vol. 113, pp. 4257-4259, Feb. 2009.
Chen, Y. et al., Chemical Physics Letters, Mass-production of highly-crystalline few-layer graphene sheets by arc discharge in various H2-inert gas mixtures, vol. 538, pp. 72-76, Apr. 2012.
Meunier, J. L. et al., 21st International Symposium on Plasma Chemistry, Homogeneous nucleation of graphene nanoflakes (GNFs) in thermal plasma: Tuning the 2D nanoscale geometry, pp. 1-4, Aug. 2013.
Anekawa, Y. et al., 21st International Symposium on Plasma Chemistry, Synthesis of graphene-based conductive thin films by plasma-enhanced chemical vapor deposition in a CO/H2 microwave discharge system, 2013.
Tatarova, E. et al., Applied Physics Letters, Microwave plasma based single step method for free standing graphene synthesis at atmospheric conditions, vol. 103, pp. 134101-134105, Sep. 2013.
Dato, A. et al., Chemical Communications, Clean and highly ordered graphene synthesized in the gas phase, pp. 6095-6097, Aug. 2009.
Novoselov, K. S. et al., Science, Electric field effect in atomically thin carbon films, vol. 306, pp. 666-669, Oct. 2004.
Castelain, M. et al., Chemical Communications, Supramolecular assembly of graphene with functionalized poly(fluorene-alt-phenylene): the role of the anthraquinone pendant groups, vol. 47, pp. 7677-7679, May 2011.
Yan, X. et al., Journal of Materials Chemistry, Solution-chemistry approach to graphene nanostructures, vol. 21, pp. 3295-3300, 2011.
Emstev, K. et al., Nature Materials, Towards wafer-size graphene layers by atmospheric pressure graphitization of silicon carbide, vol. 8, pp. 203-207, Mar. 2009.
Wurstbauer, U. et al., Carbon, Molecular beam growth of graphene nanocrystals on dielectric substrates, vol. 50, pp. 4822-4829, 2012.
Dhar, S. et al., AIP Advances, a new route to graphene layers by selective laser ablation, vol. 1, p. 022109, 2011.
McAllister, M. J. et al., Chemistry of Materials, Single sheet functionalized graphene by oxidation and thermal expansion of graphite, vol. 19, pp. 4396-4404, 2007.
Vlassiouk, I. et al., Carbon, Large scale atmospheric pressure chemical vapor deposition of graphene, vol. 54, pp. 58-67, 2013.
Reina, A. et al., Nano Letters, Large area, few-layer graphene films on arbitrary substrates by chemical vapor deposition, vol. 9, No. 1, pp. 30-35, 2009.

(56) References Cited

OTHER PUBLICATIONS

Angstron Materials; Vorbeck Materials in Jessup, Maryland; XG Sciences in East Lansing, Michigan.

Hernandez, Y. et al., Nanotechnology, High-yield production of graphene by liquid-phase exfoliation of graphite, vol. 3, pp. 563-568, Sep. 2008.

Dato, A. et al., New Journal of Physics, Substrate-free microwave synthesis of graphene: experimental conditions and hydrocarbon precursors, vol. 12, p. 125013, 2010.

E. Tatarova et al.,"Microwave plasmas applied for the synthesis of free standing graphene sheets", Journal of Physics. D: Applied Physics 47, 385501, pp. 1-11, Aug. 22, 2014.

Y. Wu et al., "Efficient and Large-Scale Synthesis of Few-Layered Graphene Using an Arc-Discharge Method and Conductivity Studies of the Resulting Films", Nano Research, vol. 3(9), pp. 661-669, Sep. 2010.

M. Leins et al., "An Atmospheric Pressure Microwave Plasma Torch", 2011.

P.L. Fauchais et al., Thermal Spray Fundamentals: From Powder to Part, Chapter 2, "Overview of Thermal Spray," Springer: New York, pp. 17-72, 2014.

S. Heidenreich et al., Fuel, "Hot gas filtration—a review", vol. 104, pp. 83-94, 2013.

C.-J. Chen et al.,"The Thermal Decomposition of Methane. I. Kinetics of the Primary Decomposition to C2H6 + H2; Rate Constant for the Homogeneous Unimolecular Dissociation of Methane and its Pressure Dependence", Canadian Journal of Chemistry, vol. 53, pp. 3580-3590, 1975.

Yang, Z., et al., "Differentiation of alkane isomers through binding energy spectra and total momentum cross sections", New J. Chem., vol. 38, pp. 1031-1039, 2014.

Sun, Q., et al., "Methane activation on Fe4 cluster: a density functional theory study", Chemical Physics Letters 550, pp. 41-46, 2012.

Merlo-Sosa, L., et al., "Dodecane decomposition in a radio-frequency (RF) plasma reactor", International Journal of Chemical Reactor Engineering, vol. 3, p. 1542, 2005.

Ogungbesan, B., et al., "Experimental validation of local thermal equilibrium in a MW plasma torch for hydrogen production", Int. J. Hyd. Energy 38, pp. 15210-15218, 2013.

Juda, K. L., et al., "Large scale synthesis of carbon nanoforms in a novel atmospheric pressure microwave plasma reactor", Proceedings of ISPC 21, Aug. 2013.

\* cited by examiner

APPARATUS AND METHOD FOR PLASMA SYNTHESIS OF GRAPHITIC PRODUCTS INCLUDING GRAPHENE

FIELD OF THE INVENTION

The present invention relates to an apparatus and method for plasma synthesis of graphitic products including graphene. It is particularly applicable, but by no means limited, to the production of such products using microwave plasma.

BACKGROUND TO THE INVENTION

Graphene is believed to have the potential to revolutionise our everyday life due to its exceptional mechanical properties (high strength and elasticity), high electrical and thermal conductivity, impermeability to gases, transparency to light etc. [1]. However, the market of a wide and versatile range of graphene applications may be impeded as a large scale and cost efficient graphene production method is currently lacking. It is predicted that advanced graphene electronics requiring relatively perfect films of large area will not leave a laboratory space soon [2]. Therefore, growth is predicted for graphene nano-platelets mainly for applications in composite materials (e.g. to enhance their strength, or their electrical and thermal conductivity), conductive paints and inks (e.g. for conductive coatings, antistatic and electromagnetic shielding, corrosion protection, gas barrier applications, etc.), and energy storage and generation [1, 2].

In order to exploit the large scale potential of graphene, the present work is focused on a plasma approach as a synthesis technique. Plasma synthesis of graphene flakes is a "bottom-up" technique of which arcs [3, 4] and inductively coupled [5] plasmas have been reported in the literature. However, these plasmas require vacuum or low pressure operation or high purity graphite electrodes with a complicated cooling system. They also run only as a batch process. Therefore, microwave plasma processes run at atmospheric pressure are especially promising [6, 7, 8].

Synthesis of graphene from microwave plasma using ethanol at the rate of 2 mg/min has been reported [8].

There is a desire to be able to carry out plasma synthesis of graphene on a larger scale.

SUMMARY OF THE INVENTION

According to a first aspect of the present invention there is provided apparatus as defined in Claim 1 of the appended claims, for plasma synthesis of graphitic products including graphene. Thus, there is provided apparatus for plasma synthesis of graphitic products including graphene, comprising: a plasma nozzle coupled to a reaction chamber; means for supplying a process gas to the plasma nozzle, the process gas comprising a carbon-containing species; and means for supplying radio frequency radiation to the process gas within the plasma nozzle, so as to produce a plasma within the nozzle in use, and thereby cause cracking of the carbon-containing species; wherein the plasma nozzle is arranged such that an afterglow of the plasma extends into the reaction chamber, the cracked carbon-containing species also passes into the reaction chamber, and the cracked carbon-containing species recombines within the afterglow, so as to form graphitic products including graphene.

As those skilled in the art will appreciate, the expression "radio frequency radiation" encompasses the full extent of microwave frequencies, together with a range of non-microwave frequencies.

By virtue of the arrangement of the plasma nozzle such that, in use, an afterglow of the plasma extends into the reaction chamber, the cracked carbon-containing species also passes into the reaction chamber, and the cracked carbon-containing species recombines within the afterglow, this enables graphitic products including graphene to be produced in a substrate-free manner on a large scale.

Optional features are set out in the dependent claims.

The plasma nozzle may be shaped and configured so as to cause, in use, at least one vortex to be formed in the process gas within the plasma nozzle, said vortex being subjected to said radio frequency radiation.

Preferably the plasma nozzle is shaped and configured so as to cause, in use, multiple concentric vortices to be formed in the process gas within the plasma nozzle, said multiple vortices being subjected to said radio frequency radiation.

The use of multiple vortices in this manner increases the time for which the process gas is exposed to the radiation, thereby increasing the efficiency of the plasma cracking process. It also allows better plasma stability by generating an area of lower pressure inside a third vortex where the plasma is more confined.

In a presently-preferred embodiment, for example, three concentric vortices are formed within the plasma nozzle.

The plasma nozzle may comprise: one or more inlets to receive a stream of the process gas, that forms a first vortex in use; an open end in communication with the reaction chamber; and a vortex-reflecting end opposite the open end; wherein the nozzle is internally tapered towards the open end; such that, in use, a second vortex is created by the vortex-reflecting end, and a third vortex is produced by reflection of the second vortex from the vortex-reflecting end. Advantageously, the second vortex is created by the vortex-reflecting end which "sucks" the first vortex (by virtue of the Coanda effect) and then reflects it to form the third vortex.

The means for supplying radio frequency radiation may comprise a microwave generator (e.g. operating at 2.45 GHz, although other frequencies are also usable). A waveguide may be arranged to direct the microwave radiation to the nozzle, e.g. to coincide with the vortex(es) of the process gas.

In presently-preferred embodiments the reaction chamber is cylindrical with curved side walls and an opening at one end or both ends for graphitic product to exit through.

Preferably the reaction chamber has a sufficiently large diameter so as to cause the afterglow to rapidly lose heat on exiting the nozzle.

Alternatively, or in addition, the reaction chamber may incorporate means for cooling the afterglow on exiting the nozzle, such as (but not limited to) water cooling or gas cooling (e.g. to blow cold gas).

Alternatively, or in addition, the surface area of the reaction chamber may be configured so as to cause cooling of the afterglow on exiting the nozzle, for example by providing an increased surface area (e.g. by incorporating fins or a structure similar to that of the bellows of an accordion).

Advantageously, the plasma is preferably generated at substantially atmospheric pressure, thereby facilitating operation.

The carbon-containing species may comprise natural gas, which advantageously is readily available and relatively inexpensive, or any other suitable species such as one or more of $CH_4$, $C_2H_6$, $C_2H_4$, $C_3He$ or $C_4H_{10}$, or others as those skilled in the art will appreciate.

In presently-preferred embodiments the process gas further comprises a buffer gas, such as argon, nitrogen or helium, or one or more other suitable gases as those skilled in the art will appreciate.

Preferably the ratio of carbon-containing species to buffer gas in the process gas is 50:50 or less. Particularly preferably the ratio of carbon-containing species to buffer gas in the process gas is around 20:80 or less. Indeed, in the present work many ratios have been tested, and it has been found that, for higher grades of product, generally at least 4-6 times more buffer gas than carbon-containing species is preferable.

The process gas may alternatively comprise $CO_2$ or $CO$, with $CO_2$ serving more as a co-reactant than a buffer gas.

Alternatively, $CO_2$ may be used as the buffer gas.

Preferably, in use, the afterglow (or reaction zone) within the reaction chamber has an operating temperature lower than 3500° C. More preferably, in use, the afterglow (or reaction zone) within the reaction chamber has an operating temperature lower than 1000° C. For instance, the operating temperature of the afterglow (or reaction zone) within the reaction chamber can be as low as 300° C. Preferably, in use, the temperature just outside the nozzle, at the carbon formation point within the afterglow, is in the range of 800° C. to 1200° C. Particularly preferably this temperature is in the range of 900° C. to 1000° C.

In order to minimise the build-up of carbon along the inner wall of the reaction chamber, the chord central angle of the interface of the nozzle with the reaction chamber is preferably greater than 0°. Particularly preferably said angle is between 50° and 180. Most preferably said angle is between 150° and 170°.

A plurality of plasma nozzles may be coupled to the reaction chamber. In such a case, in order to minimise the build-up of carbon along the inner wall of the reaction chamber, the chord central angle of the interface of each nozzle with the reaction chamber is preferably between 0° and 180°. Particularly preferably said angle is between 50° and 170°. Most preferably said angle is between 70° and 160°.

The apparatus may further comprise means for delivering gas around the interface between the or each nozzle and the reaction chamber, so as to maintain sufficient gas flow to minimise carbon deposition.

In one embodiment the gas is directed towards the nozzle exit along the wall of the nozzle/reaction chamber interface.

In another embodiment the gas is directed from the nozzle along the walls of the nozzle/reaction chamber interface, towards the void of the reaction chamber.

The apparatus may further comprise means for removing graphitic product from the walls of the reaction chamber, such as one or more mechanical scrapers or blowing gas, for example.

The apparatus may further comprise a gas filtration system coupled to the reaction chamber (e.g. situated above the reaction chamber). The gas filtration system may comprise an elongate chamber comprising one or more filter candles. Means for blowing gas through the elongate chamber, to dislodge graphitic product from the filter candle(s), are preferably also provided.

As an alternative to a gas filtration system, a bag filter may be used to collect the graphitic products, as those skilled in the art will appreciate.

According to a second aspect of the invention there is provided a method of synthesising graphitic products including graphene, the method comprising: coupling a plasma nozzle to a reaction chamber; supplying a process gas to the plasma nozzle, the process gas comprising a carbon-containing species; and supplying radio frequency radiation to the process gas within the plasma nozzle, so as to produce a plasma within the nozzle, and thereby cause cracking of the carbon-containing species; wherein the plasma nozzle is arranged such that an afterglow of the plasma extends into the reaction chamber, the cracked carbon-containing species also passes into the reaction chamber, and the cracked carbon-containing species recombines within the afterglow, so as to form graphitic products including graphene.

Optional or preferable features relating to the second aspect of the invention correspond to the optional or preferable features mentioned above in respect to the first aspect of the invention.

At least one vortex may be formed in the process gas within the plasma nozzle, said vortex being subjected to said radio frequency radiation.

Preferably multiple vortices (e.g. three concentric vortices) are formed in the process gas within the plasma nozzle, said multiple vortices being subjected to said radio frequency radiation.

The radio frequency radiation may be microwave radiation. The method may further comprise directing the radiation to the vortex(es) of the process gas, e.g. using one or more waveguides.

Preferably the reaction chamber has a sufficiently large diameter so as to cause the afterglow to rapidly lose heat on exiting the nozzle.

Alternatively, or in addition, the method may further comprise applying means such as water cooling or gas cooling such as to cool the afterglow on exiting the nozzle.

In a presently-preferred embodiment the method further comprises generating the plasma at substantially atmospheric pressure.

Advantageously and preferably, the process gas is cracked without being introduced into a thermal zone.

Preferably the afterglow (or reaction zone) within the reaction chamber has an operating temperature lower than 3500° C. More preferably the afterglow (or reaction zone) within the reaction chamber has an operating temperature lower than 1000° C. For instance, the operating temperature of the afterglow (or reaction zone) within the reaction chamber can be as low as 300° C.

During production of the graphitic products, the temperature just outside the nozzle, at the carbon formation point within the afterglow, is preferably in the range of 800° C. to 1200° C., and even more preferably is in the range of 900° C. to 1000° C.

A plurality of plasma nozzles may be coupled to the reaction chamber.

The method may further comprise delivering gas around the interface between the or each nozzle and the reaction chamber, so as to maintain sufficient gas flow to minimise carbon deposition.

In one embodiment the gas is directed towards the nozzle exit along the wall of the nozzle/reaction chamber interface.

In another embodiment the gas is directed from the nozzle along the walls of the nozzle/reaction chamber interface, towards the void of the reaction chamber.

The method may further comprise subjecting the reaction chamber to gas filtration. As part of this, the method may further comprise blowing gas to dislodge graphitic product collected as a result of the gas filtration.

As an alternative to using gas filtration, the method may further comprise collecting the graphitic products using a bag filter.

Advantageously, the method may further comprise extracting the graphitic product using a continuous extraction process.

BRIEF DESCRIPTION OF THE DRAWINGS

Embodiments of the invention will now be described, by way of example only, and with reference to the drawings in which.

DETAILED DESCRIPTION OF PREFERRED EMBODIMENTS

Figure 1:
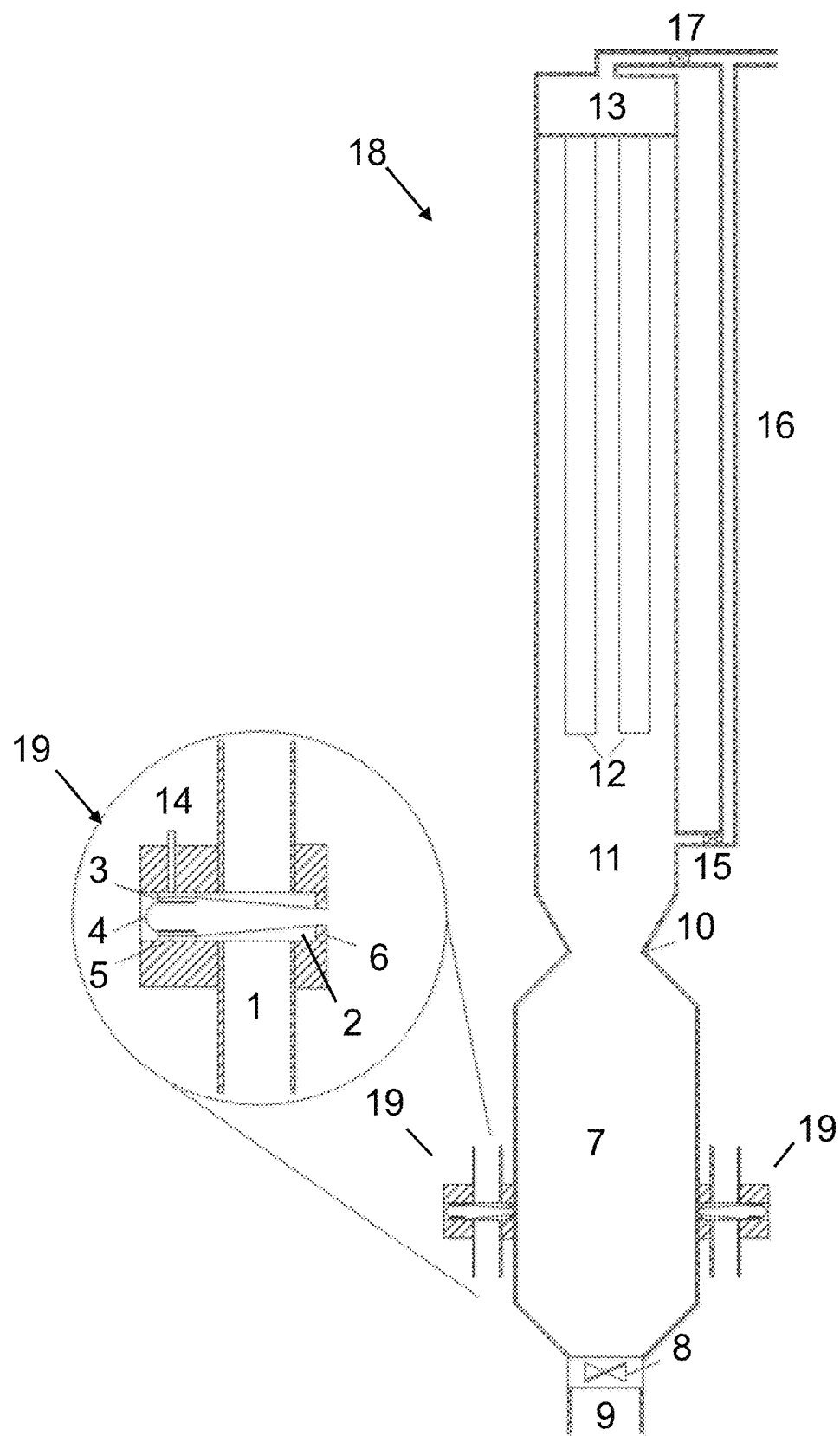
FIG. 1 illustrates an embodiment of the present invention, including a plasma nozzle, afterglow reaction chamber and hot gas filter, for the plasma synthesis of graphitic products including graphene.

The present embodiments represent the best ways known to the applicants of putting the invention into practice. However, they are not the only ways in which this can be achieved.

Initial Summary

The present work provides a method and apparatus for the continuous production of substrate free graphene at ambient pressures. It is suitable for use with methane and many other carbon sources. It also provides a solution for scale-up and carbon collection.

A modified microwave plasma nozzle (WO 2012/147054 A1) is attached to a modified afterglow chamber (WO 2010/094972 A1 and WO 2010/094969 A1) to rapidly produce a continuous stream of graphene platelets from the gas phase. A hot gas filter system is attached to one end of the afterglow chamber and is configured to continuously separate the solid carbon product from the process gases.

Value of the Present Work

The present work resolves the manufacturing problems faced by other methods, mainly scalability, elemental purity, high cost and energy input. It also reduces the number of steps in the manufacturing process on the way from the carbon source to the final product (graphene).

Further Background and Overview

At the present stage of graphene development, only a few methods are used for graphene synthesis. These are micromechanical cleavage [9], supramolecular assembly [10], solution-chemistry approach [11], graphitization of SiC wafer [12], molecular beam epitaxy [13], laser ablation [14] and thermal delamination of oxidised graphite [15]. The production capacity of these methods is very little, often suitable only for laboratory demonstrations as could be only expressed in number of flakes produced in an hour. Another drawback is that these techniques often involve ultra-high vacuum conditions, expensive substrates, and complex and high energy input procedures.

A more scalable and therefore promising chemical vapour deposition (CVD) is a "bottom-up" method proposed for large areas graphene flakes [16]. However, it involves expensive substrates and complex post-processing of graphene delamination and transfer [17]. Although this synthesis method is referred to as large [16], it is unable to result in a bulk quantity of freestanding graphene at a large scale.

The only currently-existing commercial candidate for large scale production of single- and multi-layer graphene flakes is graphite exfoliation by ultrasonication in organic or acidic media [18]. This is a "top-down" approach starting from graphite which undergoes a number of modification and delamination processes. This involves the use of expensive reagents, long ultrasonication and centrifugation, and requires long thermal post-treatment. Moreover, the residual solvents may not be completely removed and stay on the surface of the graphene, increasing its weight by several weight percent. Also various functional group impurities become covalently bonded to carbon atoms in the graphitic sheets, severely deteriorating the material's mechanical, electrical and thermal properties. It should also be added that it is a batch rather than continuous process, taking at its best about 6 hours with only 1 weight percent of graphene yield [19].

The present work provides a method comprising microwave plasma cracking of carbon feedstock and subsequent recombination of the carbon species into graphene flakes. There have been attempts reported of graphene synthesis in microwave plasma reactors [7, 20]; however those operated at low power, low carbon source feed rate (as the higher would destabilise the plasma), in the environment of noble gases like argon or helium, and with deposition rate up to 25 mg/min.

The present work offers the possibility to synthesise 15-20 grams of graphene material per kilowatt hour (at 5 kW microwave power, 100 g/hour has been achieved). This makes it the only large scale synthesis method of freestanding single- and multi-layer graphene and graphitic platelets. It is also the only process which can be continuous and scalable. It employs cheap reactants, i.e. nitrogen, methane or carbon dioxide, which can be replaced with mains, untreated natural gas (NG), and transforms these into high value product. Reaction operates under normal pressure conditions, without catalysts, other expensive precursors, or external heating. The quality of the microwave plasma synthesised graphene is high, comparable to graphene from liquid exfoliation methods. Unique though is the process's simplicity which results at the same time in the high elemental purity of the as-synthesised material, of over 99 wt % of carbon.

This large scale carbon material synthesis is achieved by the unique design of our microwave plasma reactor. Its operation at atmospheric pressure and high carbon feedstock flow rate neither destabilises nor extinguishes the plasma and is made possible by a specially developed plasma nozzle, which enables the process to be continuous and scalable. This high reaction efficiency combined with the high carbon feedstock reforming yield is not achievable in conventional thermal processes.

In more detail, the present work provides a method and apparatus for large scale and continuous production of high quality graphene nanoplatelets. Embodiments of the method and apparatus are designed to achieve the following objectives:
1. Production of graphene nanoplatelets at very large scale, suitable for commercial and industrial requirements.
2. High quality of flakes, namely samples with high single layer nanoplatelet content.
3. Controllability over the materials in terms of flake size, thickness, structure through the tuning of process conditions, which controls in turn the electrical and physical properties of the material.
4. Simplicity of production through low power consumption and the use of freely available feedstock including widely available gases such as methane and carbon dioxide, without the use of catalyst or additives.

In the present work, single- and multi-layer (2 layers and more) graphene, and graphitic flakes are synthesised from a carbon feedstock brought to a plasma state by microwave frequency discharges at atmospheric pressure. The synthesised material can be formed in the gas phase during the time of flight and later on deposited on the wall of the reaction chamber or collected by different means, including hot gas filters.

Although the presently-preferred embodiments use microwave radiation (of frequencies of the order of 300 MHz or greater) to produce a plasma to crack the carbon-containing species within the carbon feedstock, in alternative embodiments radio frequency radiation outside the microwave range may be employed.

Graphene Production Apparatus—Overview

FIG. 1 illustrates a presently-preferred embodiment of a graphene production apparatus 18 provided by the present work. The plasma system according to this embodiment consists of a microwave generator (2.45 GHz), a wave guide 1 and an atmospheric pressure plasma nozzle 19, a cylindrical plasma afterglow reaction chamber 7 and a modified hot gas filter system 11. Generators with lower frequencies have also been tested, including microwave generators at 896 MHz.

The process gas (comprising a carbon-containing species and a buffer gas) is passed through a dielectric tube 2 within the plasma nozzle 19, which bisects the microwave field within the waveguide 1. Inside the plasma nozzle 19, the gas forms several vortices due to the design of the nozzle, resulting in an extended exposure to the microwave field and generates a stable non-equilibrium plasma close to atmospheric pressure. For the sake of completeness, we note here that the plasma is not technically at atmospheric pressure since it is formed at the core of a vortex. Thus, its pressure is likely to be lower than atmospheric (pressure at the injection point). However, there is no further system used to decrease the pressure of the system other than the fluid mechanics induced by the described design.

The carbon-containing species within the process gas is cracked within the plasma. Methane, for instance, is cracked into carbon and hydrogen.

The afterglow of the plasma extends from within the nozzle 19 to within the adjoining reaction chamber 7. The cracked process gas also passes into the afterglow reaction chamber 7.

Within the plasma afterglow (within both the nozzle 19 and the reaction chamber 7, and as indicated by lengths L and E in FIG. 2 as discussed below), the cracked carbon-containing species of the process gas cools and solidifies to form solid carbon of very high purity (>99.5%), including graphene flakes. The design and conditions within the afterglow reaction chamber 7 allow the control of the exact carbon morphology which results in the production of graphene.

The solid carbon then passes up through the hot gas filter 11 and collects on the surface of filter candles 12 suspended within the filter housing. The candles are specified to allow the transmission of gases and vapourised liquids, but capture the graphene flakes. The filter unit 11 periodically enacts a blow back sequence of inert gas through the filter candles 12 which provides sufficient force to knock off the solid carbon and to allow it to fall down through the afterglow chamber 7 and be collected at the bottom 9 of the system. The waste process gas is transported from the top of the filter to an oxidation unit to destroy any harmful by-products produced during the graphene synthesis process.

Graphene Production Apparatus—In More Detail

As mentioned above, FIG. 1 illustrates a presently-preferred embodiment of a graphene production apparatus 18, including a plasma nozzle 19, a reaction chamber 7, and a hot gas filter chamber 11. The process gas (comprising a carbon-containing species and a buffer gas) enters the nozzle 19 via inlet 14, through gas injection air knives 5 which cause the formation of a vortex stream spiralling down the tube. The empty space 4 at the back of the nozzle causes the creation of a second vortex by virtue of the Coanda effect, and a third vortex by reflexion in the opposite direction. This way, the gas stream has a longer residency time in the microwave which is channeled through the waveguide 1, ensuring better plasma stability. The three layers of vortex provide a greater thermal barrier which protects the inner walls of the nozzle from the hot plasma. Producing a vortex within a vortex within a vortex enables the production of a central vortex that is relatively small in diameter. This results in a very high rotational velocity, which subsequently creates a lower pressure zone in the centre of the vortex when compared to the same sized single vortex nozzle. Because plasma cracking efficiency is largely affected by the loss of energy from inelastic collisions between electrons and larger ions, the reduction in pressure increases the mean free path of the electrons, therefore resulting in fewer collisions.

Creating a narrow vortex in this particular way also has the beneficial effect of creating turbulence between the counter flowing vortices which results in the re-circulation of gases, further increasing the residence time within the nozzle and therefore increasing the chance of ionisation occurring. The ionised gas stream/afterglow exits the nozzle 19 through the nozzle insert 6 into the reaction chamber 7.

The solid product/graphene is formed at the exit of the nozzle 19, in the afterglow of the plasma, and ejected into the reaction chamber 7, spiralling upwards due to the vortex movement and its temperature. Passing 10 and 11, carbon is collected on the filter candles 12. To remove carbon from these filter candles in situ/continuously during the reaction, nitrogen is blown periodically through the filter candles 12. To prevent pressure build up in the system causing plasma instabilities during such a blow-back cycle, the gate valve 15 opens simultaneously and the purge gas exits through bypass 16.

SUMMARY OF ELEMENTS SHOWN IN FIG. 1

Figure 2:
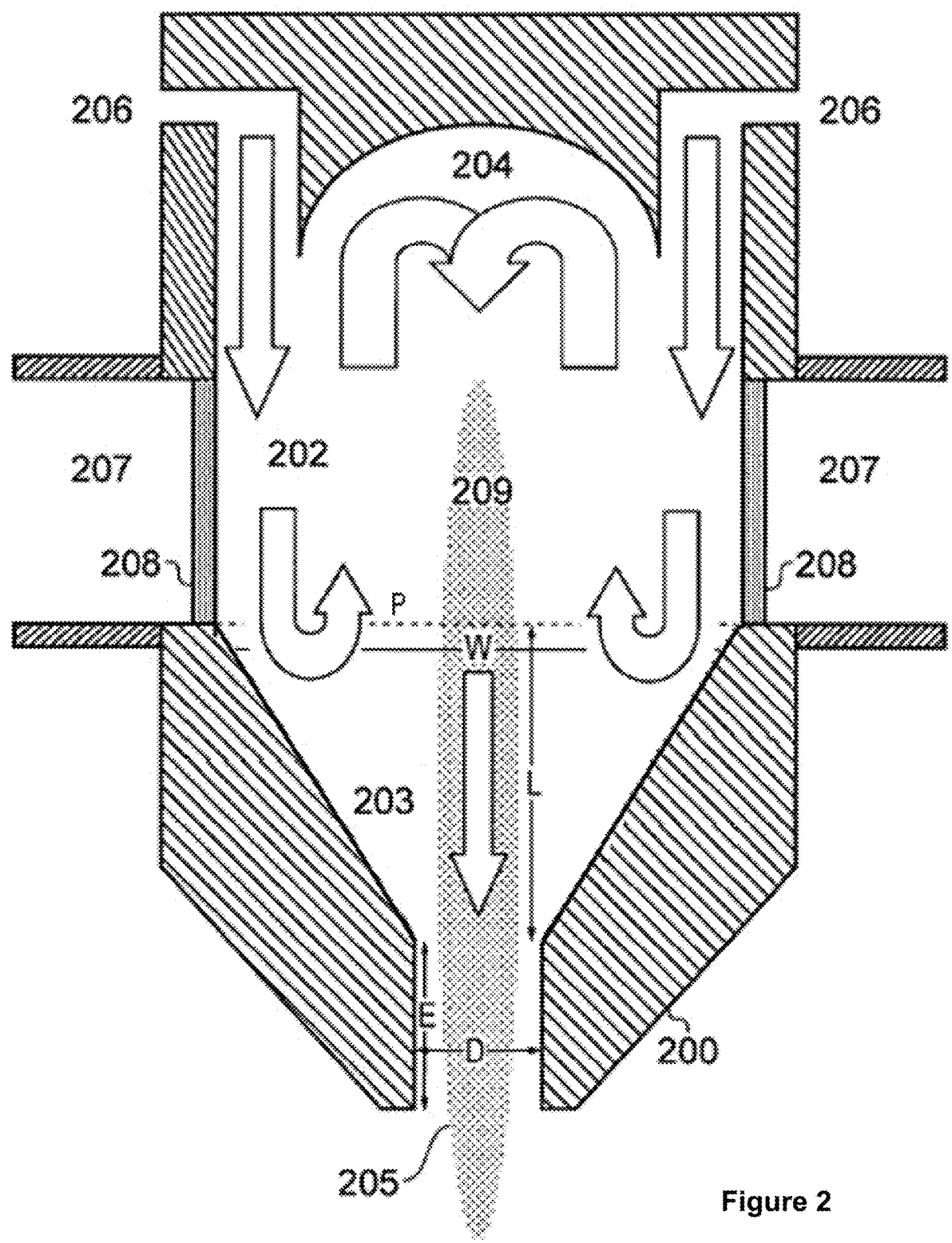
FIG. 2 is a simplified drawing of the plasma nozzle of FIG. 1.

1 Waveguide
2 Dielectric tube
3 Vortex finder
4 Vortex reflector
5 Gas injection
6 Compression nozzle
7 Reaction chamber
8 Split butterfly valve
9 Carbon collection
10 Open annulus
11 Filter chamber
12 Filter candles
13 Gas exit
14 Gas inlet
15 Gate valve
16 Purge by-pass
17 Gate valve
18 Overall apparatus
19 Plasma nozzle FIG. 2 is a simplified drawing of the nozzle (the nozzle 200 being shown rotated through 90° relative to the orientation of nozzle 19 in FIG. 1) and shows how the triple vortex is formed. Process gas enters through air knives 206, spirals down along the wall 202 and through a dielectric tube 208, where it is subjected to the microwave radiation exiting the wave guide 207. Along the taper 203, a counter vortex is created by the plasma finder 204 via the Coanda effect in the opposite direction on the inside of the first vortex, subjecting the gas stream to the microwave for the second time. The plasma finder 204 finally sends the gas back through the microwave for the third time. The plasma 209 is thus contained in the centre part of the nozzle, the outer two vortices protecting the tube from getting into contact with the plasma. Formation of the desired solid carbon species occurs along the entire length labelled L and E.

Figure 3:
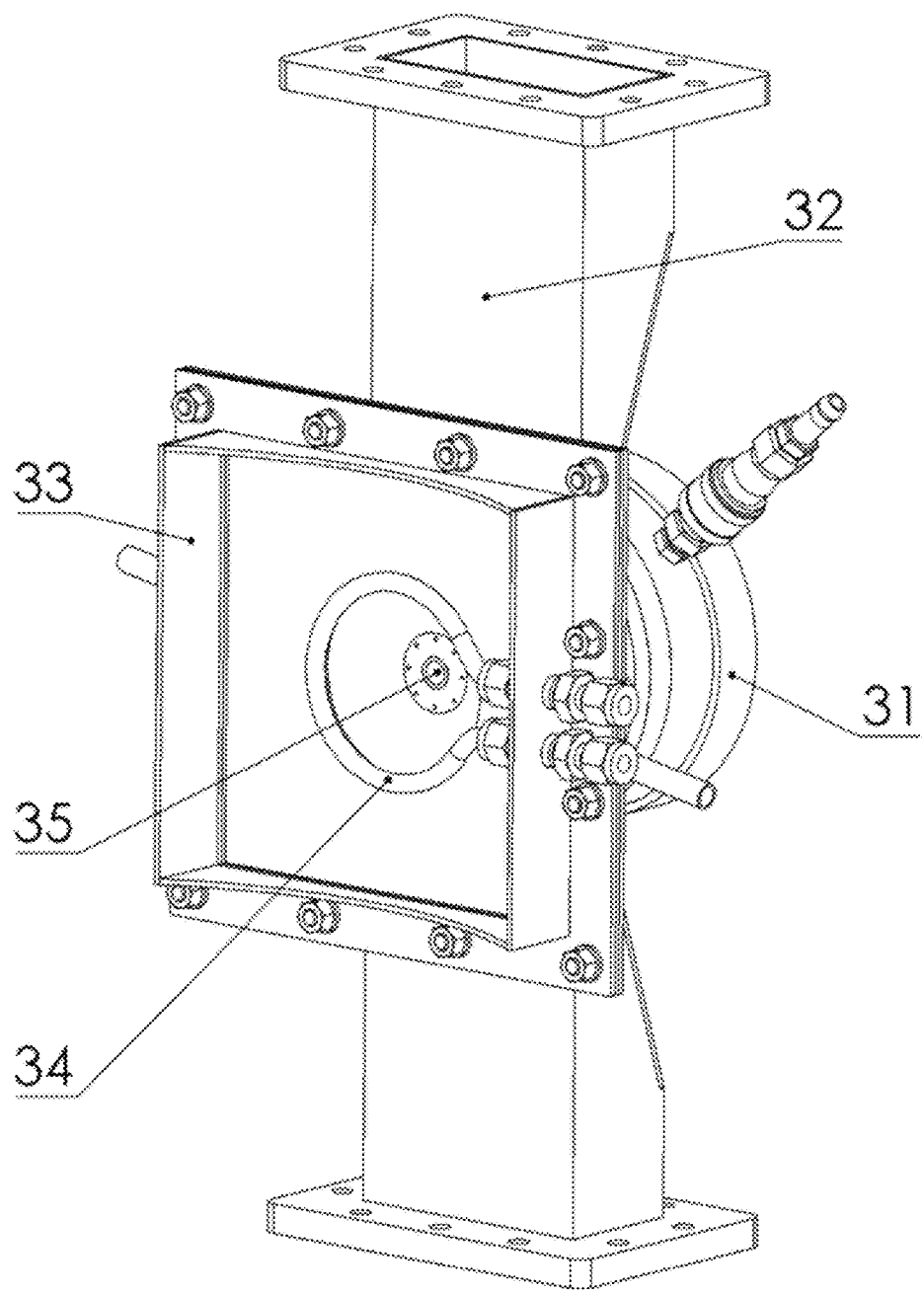
FIG. 3 illustrates the interface between the plasma nozzle, wave guide and reaction chamber with a purging ring.

FIG. 3 illustrates, in a perspective view, the interface between the plasma nozzle 31, the wave guide 32 and the reaction chamber 33, incorporating a purging ring 34. The gas flow exits from the outlet of the nozzle 35 and enters the reaction chamber 33 (where, in this case, only portions of the walls are shown). The purging ring 34 prevents carbon blockage at the outlet of the nozzle.

A presently-preferred embodiment of the invention is hitherto described and illustrated in FIG. 1. However, the invention is not limited to the exact specification described herein and a person skilled in the art will understand the concepts in use which could create other forms of the embodiment.

The presently-preferred method comprises the following steps:
  Injecting the process gas (i.e. selected carbon feedstock gas and buffer gas) into a plasma nozzle.
  Forming multiple vortices in the process gas within the plasma nozzle.
  Passing the process gas through a microwave field in order to crack the feedstock gas.
  Forming graphene material in the afterglow of the plasma as it exits the nozzle.
  Passing the gas through a designed reaction chamber to form the graphene material.
  Collecting the synthesised materials, e.g. in a modified hot gas filtration system.

Role and Choice of Process Gas Composition, Buffer Gas and Temperature

The process gas comprises:
  a carbon source such as, but not limited to, $CH_4$, $C_2H_6$, $C_2H_4$ or $C_3H_8$, $C_4H_{10}$; and
  a buffer gas, usually inert—such as, but not limited to, $N_2$, Ar or He.

The carbon source is cracked in the plasma nozzle 19 (FIG. 1) and the resulting carbon species later recombines into graphene in the reaction chamber 7.

$CO_2$ and $H_2$ can also be used to replace the buffer gas. However, these gases will also participate in the reaction. $CO_2$ will partially crack, where the oxygen radical can undergo side reactions with the developing carbon to form carboxylic or alcohol functional groups on graphene or undesired organic by-product. $H_2$ has an influence on the recombination of the carbon species with the hydrogen coming from natural gas cracking.

The buffer gas is used as a diluter to prevent too high density of carbon radicals while maintaining the plasma stable by providing enough gas to take the energy from the microwave field.

The buffer gas is also used to control the reaction temperature in the afterglow zone.

In our presently-preferred embodiments, natural gas is used as the feedstock gas and argon is used as the buffer gas. However, other feedstock gases and buffer gases may alternatively be used, as discussed elsewhere herein.

For graphene formation in the described plasma system, cracking of the hydrocarbon chosen as the carbon precursor (natural gas, or any of its components, liquids like oils, toluene, etc.) has to occur in the plasma nozzle and the right gas has to be chosen for dilution. Cracking of the carbon source would already occur in a standard plasma system widely used in research institutions, where gas is channeled into a simple ring through four concentric holes, creating a crude vortex spiralling down a quartz tube. The gas will be cracked when passing through the quartz tube and the microwave field. The cracking efficiency of methane in such a system is about 30% (methane to carbon conversion). The available power rating before burning the quartz is limited. Experiments can normally not exceed 15-20 minute runs. However, in the present work, improving the nozzle in terms of vortex creation and especially introduction of a double and triple stream through the nozzle, has allowed us to improve methane cracking to about 99%. Nozzle openings affect the shape (length and width) of the plasma torch and thereby define the point at which graphene forms, as well as the heat dissipation at that point.

An important factor for harvesting high quality material (few layer graphene flakes with high conductivities in pressed pellets) is the temperature at the carbon collection point. At the point of graphene formation at the beginning of the afterglow, inert gases are used to reduce the carbon to power ratio in order to achieve a temperature of around 900-1000° C., which is the range where graphene can grow with a very low level of defect density. Heat dissipation immediately after graphene formation in the afterglow of the plasma is desirable in order to maintain good quality graphene flakes (as, once formed, the graphene would deteriorate over time if constantly subjected to high temperature). This is achieved via a large diameter chamber (e.g. chamber 7 in FIG. 1) attached to the plasma nozzle 19. Expansion of the gas directly after the plasma nozzle allows for the necessary temperature decrease to avoid deterioration of the graphene sample. The type and quality of the material will strongly depend on the carbon source, the inert gas used to dilute the carbon source and the power rating which is coupled with the temperature generated from the shape of the plasma and therefore the afterglow.

In general it can be observed that a higher degree of dilution of the carbon species results in fewer layer graphene, fewer defects due to slower growth and higher afterglow temperature, and higher conductivities on pressed pellets.

Excess methane, as the most stable component of the common carbon source natural gas, can also be used as the most effective dilutant of the produced solid carbon species. Agglomeration of the resulting graphene is therefore prevented more efficiently and fine powder of single to few layer graphene can be obtained. $CO_2$ has a similar effect.

Further Considerations in Respect of Plasma Temperature

Figure 27:
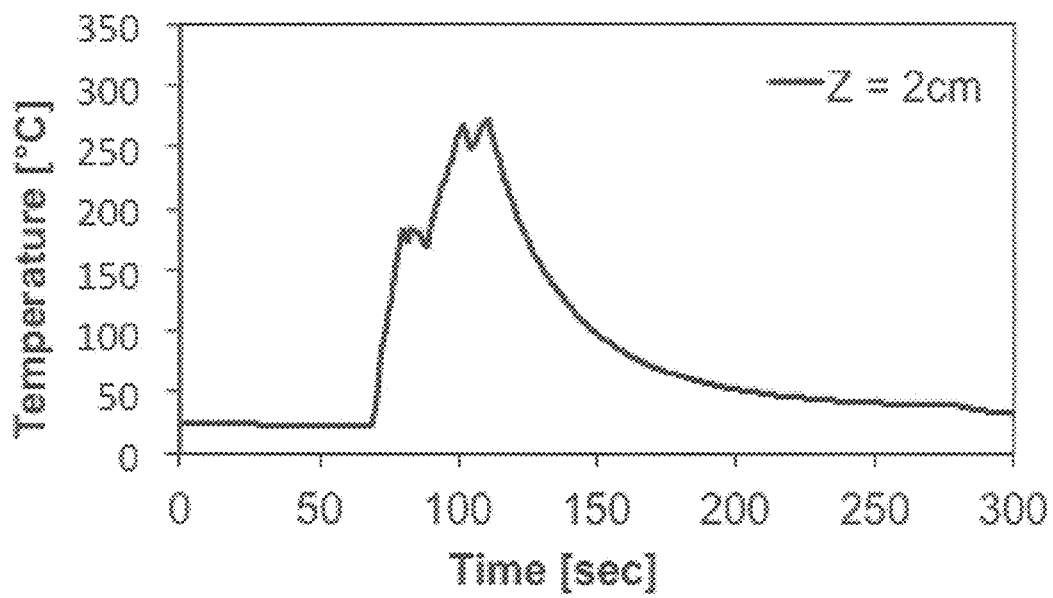
FIG. 27 shows an experimentally-measured temperature profile at a point 2 cm from the plasma zone during plasma ignition.
Figure 28:
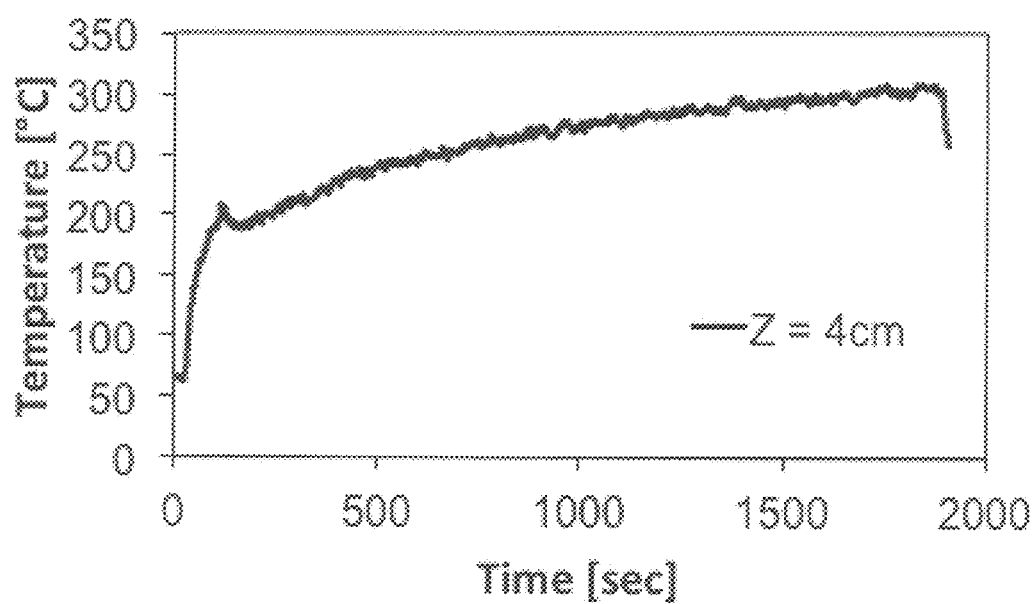
FIG. 28 shows an experimentally-measured temperature profile at a point 4 cm from the plasma zone during typical operation.
Figure 29:
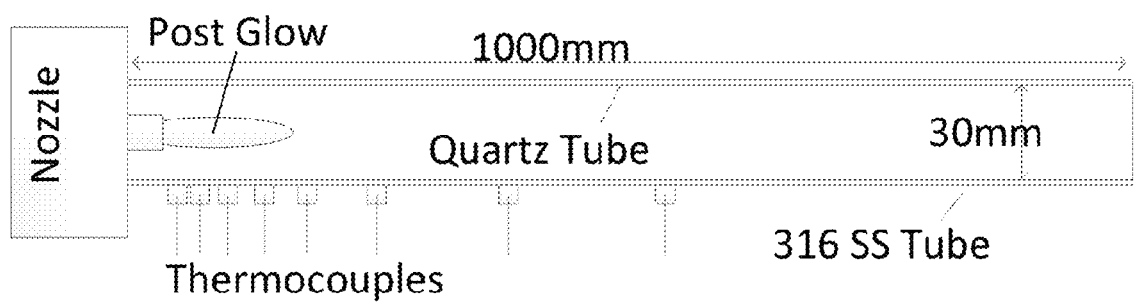
FIG. 29 shows a configuration of thermocouples in the reaction chamber, as used to obtain the test results shown in FIGS. 27 and 28.

In our presently-preferred embodiments the plasma system using microwaves runs at a relatively low temperature, which is key in simplifying the process and facilitates scale-up. This is a significant advantage over thermal plasmas, which commonly operate at temperatures over 1000° C. In contrast, in the presently-preferred embodiments, the gas is cracked in the nozzle where the plasma forms. In microwave plasma, electron and ion temperatures differ. Temperature in the afterglow at the exit of the plasma is produced due to the recombination of ions in the afterglow, the ion-electron recombination process being an exothermic reaction. Tests we have carried out have shown that typical temperatures in the afterglow are around 150° C. immediately after plasma ignition, as shown in FIG. 27. Temperature will build up over time in the closed reaction chamber to reach around 350° C. in normal operation, as shown in FIG. 28. FIG. 29 shows the configuration of thermocouples used to measure the temperature in the reaction chamber in such tests. Further operation conditions can bring the temperature up to 1000° C.

Going into the test results shown in FIGS. 27 and 28 in more detail, FIG. 27 shows the measured temperature profile at a point 2 cm from the plasma zone during plasma ignition. The temperature is measured very close to the exit of the plasma nozzle, at the very beginning of the afterglow zone. The zone is initially at room temperature. The plasma is ignited after 70 s. The temperature increases over the next 10 s in the afterglow to reach about 150° C. Introduction of higher flows causes the temperature to increase up to 280° C. The plasma is then switched off after 120 s.

FIG. 28 shows the measured temperature profile at a point 4 cm from the plasma zone during typical operation. The temperature is measured over 1800 s. After ignition at 70 s, larger gas flow is introduced to start the graphene synthesis reaction. Temperature in the afterglow will build up over time due to the confined space in the reaction chamber, reaching about 300° C. at the end of the run.

FIG. 29 shows the configuration of thermocouples in the reaction chamber, as used to obtain the test results shown in FIGS. 27 and 28. A series of thermocouples are positioned along the afterglow (labelled "Post Glow" in FIG. 29), at the exit of the plasma nozzle. The temperature measurement points are along the axis of the plasma.

Role of Power

As a general rule, higher power of the plasma system gives better cracking efficiency and allows processing of higher flow rates. The route to scale up consists in adapting the nozzle design, optimising the process gas composition and reaction chamber design to a higher power.

Scaling and increasing the power of the plasma system can be achieved in two ways. It is either possible to combine several nozzles around a reaction chamber or increase the power of the microwave generator and design a larger nozzle. Most experiments have been run between 1 and 20 kW. However, there is no restriction of scale on the nozzle.

In a typical experiment at 6 kW, total gas flows (i.e. carbon source+buffer gas) around 25-45 L/min (litres per minute) are common. Experiments at 20 kW take place in a larger system. A larger waveguide enables utilisation of a larger nozzle which makes higher gas flows and therefore powers possible. Typical gas flows are between 70-130 L/min.

Plasma Nozzle (Method for Processing the Gas)

As described above, the process gas (carbon source+buffer gas) is injected into a plasma nozzle 19 (FIG. 1). In the presently-preferred embodiments, the processing method using the plasma nozzle consists of:

Employing an elongated vessel with an inner space of conical symmetry which
  (i) at a first end has an exit opening located at the centre axis;
  (ii) is open at the second end opposite the first end; and
  (iii) is transparent to microwave energy Forming a first vortex flow of the gas that is to be processed running along the inner wall of the inner space of the vessel from a distance below the second end to the middle of the inner space of the vessel.

Forming a second vortex flow of gas that is to be processed running along the centre axis of the vessel from the middle of the inner space of the vessel towards the second exit of the vessel and along the wall of the vortex finder space.

Forming a third vortex flow of gas that is to be processed running along the centre axis of the vortex finder into the inner space of the vessel and out of the exit opening at the first end, and Forming a standing wave microwave aligned to form a wave crest at the centre axis of the vessel which is transparent to microwave energy with sufficient intensity to excite at least a portion of the gas in the third vortex to form a microwave plasma.

The rotating ionised gas passes co-axially through the inner space of the compression elongated vessel and exits through the first end into the reaction chamber.

Use a gas purging ring to prevent carbon build-up at the nozzle exit (by purging and cooling).

Figure 4:
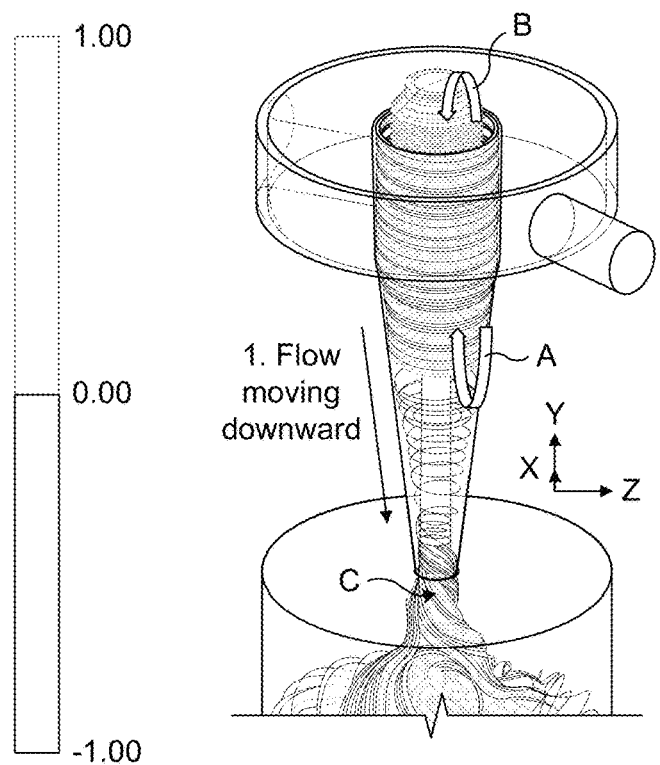
FIG. 4 shows a computational fluid dynamics (CFD) simulation showing a triple vortex structure.

FIG. 4 shows a computational fluid dynamics (CFD) simulation showing the triple vortex structure. The curved arrow A in the middle shows the formation of the first vortex from the gas inlet and the first counter vortex. The curved arrow B at the top shows the formation of the third vortex at the back of the nozzle. The arrow C points to the exit of the nozzle.

Reaction Chamber (Method for Controlling Plasma Recombination into Graphitic Structures)

The nozzle 19 (FIG. 1) may be coupled directly to the reaction chamber 7 so as to input ionised gas/plasma into the chamber at an angle to the chamber walls.

Preferably, the gas stream coming out of the nozzle 19 is tangential to the reaction chamber cylinder.

Preferably, the reaction chamber 7 has a much larger volume than the nozzle 19, such that the gas stream coming out of the nozzle can expand.

Preferably, the reaction chamber 7 has curved side walls and may accommodate multiple plasma nozzle inlets around its circumference.

In the presently-preferred embodiments, the ionised gas passing into the inner space of the reaction chamber 7 will form a rotating flow along the inner wall and have an increased residence time in the afterglow environment.

The gaseous and fine solid materials will flow towards the first exit 10, the opening on the top wall of the reaction chamber 7.

Sufficiently agglomerated carbon will pass down towards the second exit, the opening 9 at the bottom wall of the reaction chamber 7.

A mechanical scraper may be coupled with the chamber 7 such as to mechanically remove large carbon aggregates on the walls of the chamber or on the filter candles 12. This is used in addition to the blowback system described on the filter part.

The reaction chamber design described herein builds upon the foundation of knowledge described in the previous general plasma reactor patent applications WO 2010/094972 A1 and WO 2010/094969 A1. In the present work, the reaction chamber 7 being spatially separate from the plasma source is of particular importance during the synthesis of high purity graphitic materials.

It is an object of an embodiment of the present invention to provide a plasma device for facilitating the reaction within a reaction chamber and the subsequent growth of graphitic carbon structures.

It is a further object of an embodiment of the present invention to provide a plasma device for the continuous production and removal of a uniform graphitic carbon product.

Accordingly, the presently-preferred embodiments of the invention provide a reaction vessel comprising a reaction chamber 7 coupled with one or more plasma nozzles 19 for directing a flow of material via the plasma generator to a respective inlet to the reaction chamber.

Preferably, the reaction chamber 7 is cylindrical with curved side walls and open at both ends. In the first instance, the plasma plumes/afterglows will extend out of the nozzle outlet into the reaction chamber 7 and extend to fill the void within the chamber. The ionised species generated by individual nozzles may combine to further improve the growth of graphitic materials and increase the efficiency of the conversion of gas to high value graphitic carbon products with improved characteristics. Reactant materials that flow around the chamber 7 will then have an increased residency time in an afterglow environment, as the afterglow from successive nozzles is encountered.

Another advantage provided by the flow conditions within the chamber is that the build-up of graphitic materials upon the side walls of the reaction vessel will be reduced.

Ideally, the carbon generated in accordance with this invention will pass through the inner space of the reaction chamber 7 and collect on the filter candles 12. In order to facilitate the continuous operation of the reaction chamber, several features are included to prevent or remove carbon build-up.

The chord central angle of the nozzle/reactor interface may be chosen in order to prevent the interference of material flow between nozzles (FIG. 1) and minimise the build-up of carbon along the inner wall of the reaction chamber 7. The flow profile should be additive in order to generate a vortex flow pattern within the cylindrical volume of the reaction chamber 7. The maximum chord central angle for a single nozzle should preferably be greater than 0° such that the flow of material from the nozzle does not interfere with the wall of the reaction chamber 7. More preferably the chord central angle should be less than 180° but greater than 50°. Most preferably the chord central angle for a single nozzle coupled to the reaction chamber should be less than 170° but greater than 150°.

Figure 5:
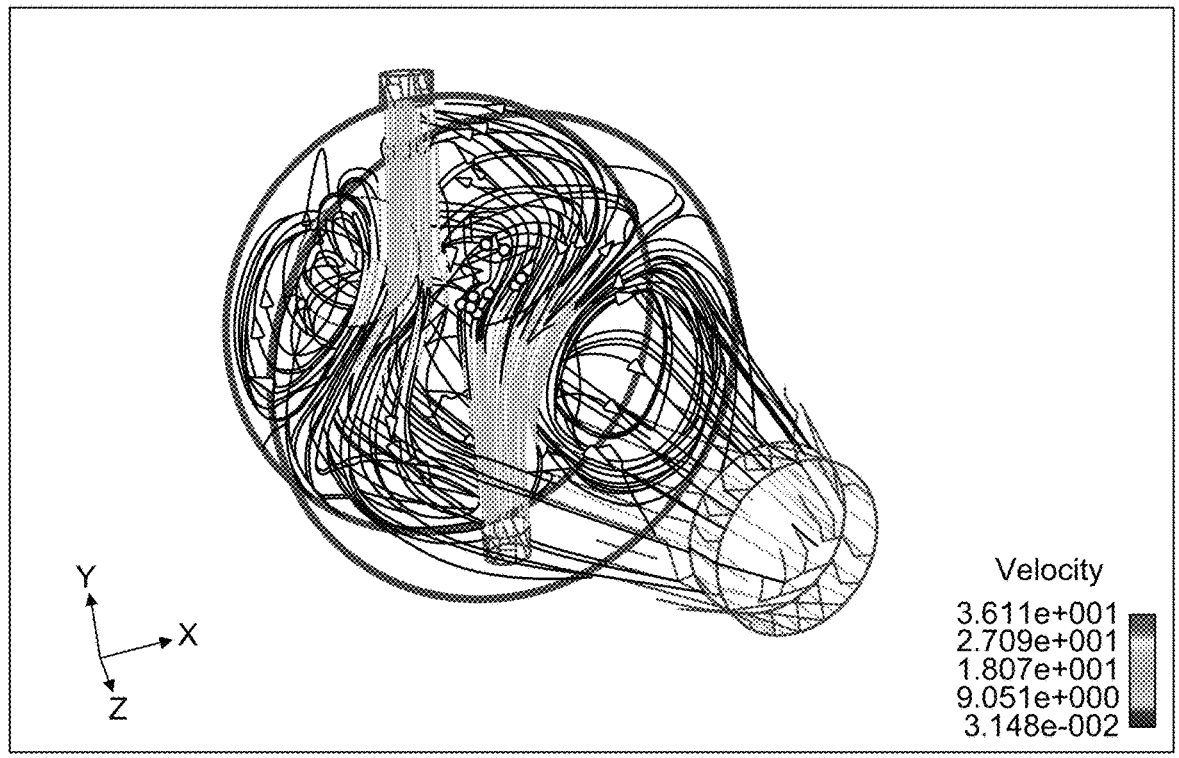
FIG. 5 illustrates a CFD model of a twin nozzle using offset tangent planes.

FIG. 5 illustrates a CFD model of a twin nozzle using offset tangent planes.

The chord central angle for two or more nozzles should preferably be less than 0° such that the flow of material from the nozzle does not interfere with the walls of the reaction chamber 7 and greater than 180° such that the flow does not interfere with the flow from the next nozzle. More preferably the chord central angle should be less than 170° and more than 50°. Most preferably the chord central angle should be less than 160° and greater than 70°.

Figure 25:
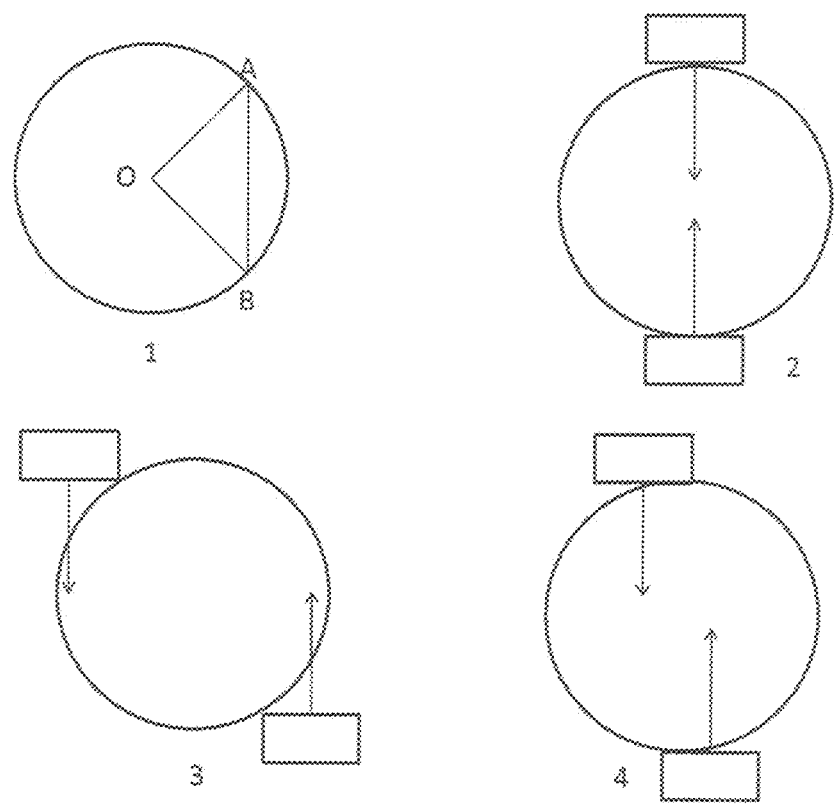
FIG. 25 is a series of schematic illustrations to explain the expression "chord central angle" in relation to the arrangement of plasma nozzles relative to the reaction chamber.

The expression "chord central angle", as used herein in relation to the arrangement of plasma nozzles relative to the reaction chamber, may be better understood with reference to FIG. 25, which consists of a series of schematic illustrations (1)-(4), in each of which the central circle represents the reaction chamber in cross-section, and the rectangles represent plasma nozzles. In (1), the chord AB has a chord central angle $\theta$, the chord being the direction the plasma bisects the circular chamber as it is ejected from the nozzle. With reference to (2), if the chord central angle is 180° then the plasma nozzles are directly opposite each other, which would be non-ideal as the plasmas produced would interfere with each other in the reaction chamber. With reference to (3), if the chord central angle is close to 0° then the plasma plume would enter the cylinder tangentially, which would also be non-ideal as there would be interference from the wall. So, as shown in (4), ideally the nozzles are angled away from the wall and away from each other.

The plasma nozzle 19 should be coupled to the reaction vessel 7 in such a way as to minimise the distance from the centre point of the plasma volume within the plasma nozzle to the reaction vessel volume. An important aspect of the present work is that formation of the graphitic carbon product should not (as far as possible) occur within the plasma nozzle 19 itself. Thus placing the centre point of the plasma close to the reaction vessel 7 reduces the likelihood of carbon formation before it has reached the void of the chamber and does not deposit around the nozzle chamber interface.

The actual distance required to prevent carbon build-up is based upon a complex interplay between the gas composition, microwave power and nozzle set-up. So in general making the distance a short as is physically possible is chosen as the simplistic option.

A further aspect of the present work is the integration of a gas delivery system around the nozzle/reaction chamber interface for the purpose of maintaining sufficient gas flow to minimise carbon deposition. The increased cold gas flow also has the added benefit of cooling this particularly hot region for the prevention of carbon sintering. Reducing the surface temperature of nozzle components to below the sintering temperature of carbon (2000° C.) enables the production of a homogeneous carbon product in addition to the continuous operation of the system.

In one embodiment, a gas is directed towards the nozzle exit along the wall of the nozzle/reaction chamber interface. The gas flow has the effect of preventing the deposition of carbon along the wall of the interface and of reducing the temperature of the wall.

In another embodiment, the gas is directed from the nozzle along the walls of the nozzle chamber interface towards the void of the chamber. The gas may be injected with the use of the multiple small holes or a Coanda ring nozzle from a small pressurised chamber situated 360° around the circular nozzle exit.

Another aspect of the post nozzle gas injection system is the ability to further control the afterglow conditions through the type and flow rate of gas used. It provides the ability to apply gas that has not been processed by the plasma nozzle to the reaction zone.

Figure 6:
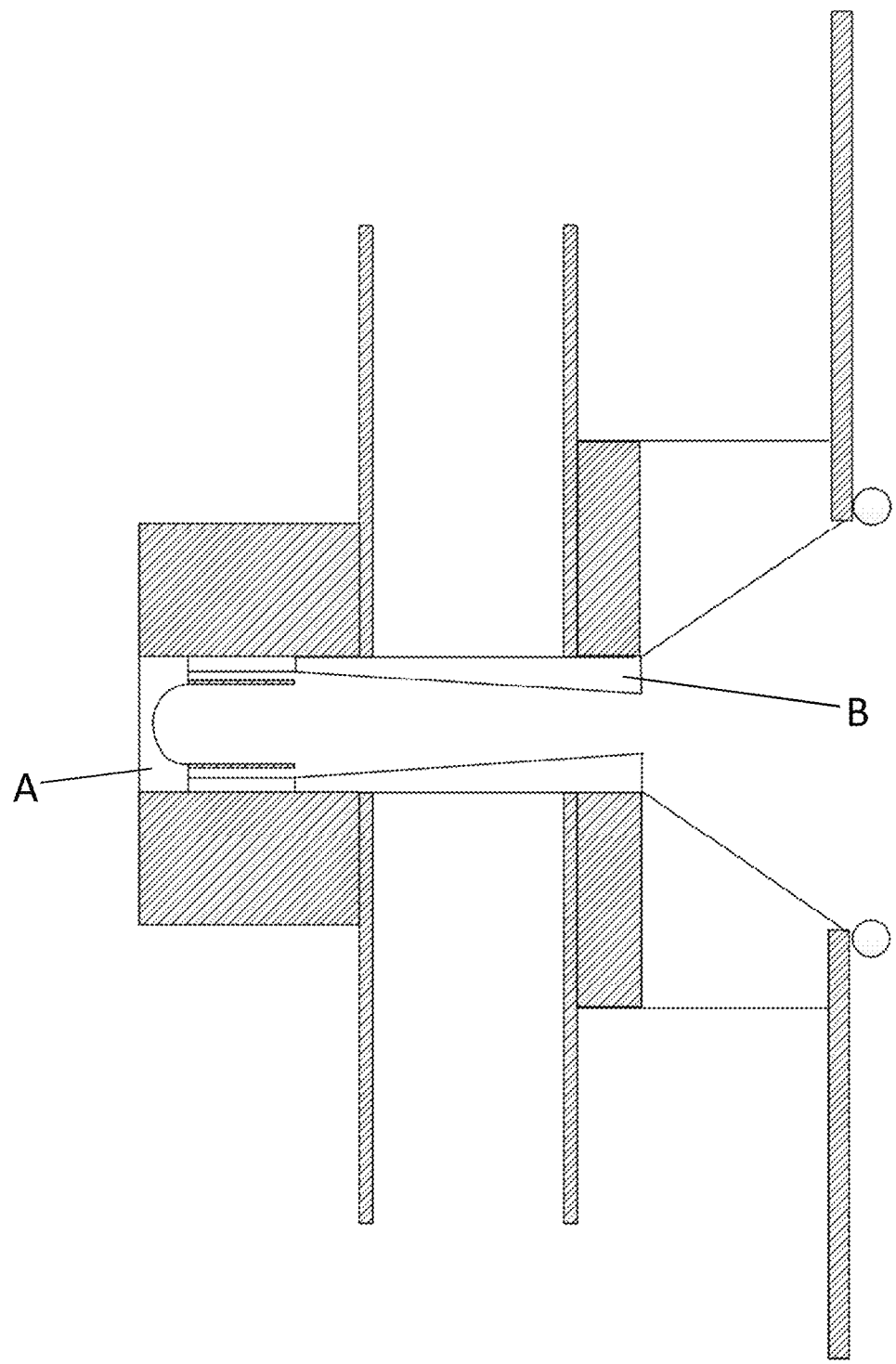
FIG. 6 illustrates a plasma nozzle, modified to prevent carbon build up by tapering the exit, with an additional channel to allow constant cooling via inert gas flow.

FIG. 6 illustrates a sectional view of the nozzle-chamber interface described in FIG. 3. The plasma finder or vortex-reflecting end is denoted by A and the elongated vessel transparent to microwave is denoted by B.

A further aspect of the present work which minimises the build-up of carbon upon the reactor wall is the inclusion of a mechanical scraper system for continually removing deposited carbon from the walls of the inner space of the reaction vessel.

In one embodiment, vertically aligned struts are placed concentrically around the cylindrical inner wall of the reaction vessel 7 and joined by a central column which can rotate up to 360°. The central strut can be rotated periodically to dislodge carbon build-up from the wall of the reaction chamber 7 in order to maintain both continuous operation and production of a uniform carbon product.

In another embodiment, horizontally aligned cylindrical scrapers, joined by a central column can move up and down the vertical axis of the reaction vessel 7.

The vertical motion also acts to dislodge the carbon product. The build-up of carbon product can alter the thermal characteristics of the reaction vessel during continuous operation negatively impacting the production of graphitic carbon structures.

Filtration system (method for collecting carbon from the gas phase) The reaction vessel may be coupled to a solid/gas filtration system.

More particularly, as shown in FIG. 1, in a presently-preferred embodiment the reaction vessel 7 is coupled coaxially to a hot gas filter system 11 capable of continuous filtration.

The gaseous and fine solid particles will pass through an annulus 10 at the base of the hot gas filter 11.

Suspended co-axially within the open space of the hot gas filter 11 are filter candles 12 for the purpose of capturing the fine solid particles and preventing their passage to the second exit 13 on the top wall of the housing.

The filter candles 12 provide sufficient pore volume to enable the passage of the gaseous products but restrict solid particles.

A filter cake will build up on the exterior wall of the candles 12, further improving the filtration capability.

Periodically a system of valves connected to the gaseous exit 13 of the filter candles 12 purges the candles with a high velocity gas stream for the purpose of dislodging the filter cake deposited upon the exterior wall.

The pore diameter used in the filter candles 12 may be 1 µm, although larger diameter pores may be advantageous to enable the filter to let more gas through, provided it still restricts the solid particles. The total pore volume has to accommodate the gas flow of the blow back pressure such that enough mass of gas is allowed through the filter candles 12 in order to act sufficiently against the carbon to knock it off.

Dislodged carbon will fall by gravity co-axially down the hot gas filter inner space, through the annulus 10 at the first exit into the inner space of the reaction chamber 7.

The carbon will continue to fall co-axially down to the second exit 9 of the reaction chamber 7, where a valve 8 can be opened to remove the solid build-up from the reaction system.

Preferably a by-pass valve system is integrated into the hot gas filter design for the purpose of improving the ability to remove nano-sized particles from the face of the filter candles 12.

One preferred embodiment of the hot gas filter includes:
- a normally-open high temperature valve 17 situated at the second exit 13 at the top of the hot gas filter; and
- a normally-closed high temperature valve 15 located on a third exit positioned axially on the cylindrical wall of the hot gas filter vessel between the first exit (open annulus 10) and the base of the filter candles 12.

The normally-open valve 17 can be closed and simultaneously the normally-closed valve 15 can be opened, to initiate the candle purge sequence.

In another preferred embodiment, the hot gas filter can be operated at a temperature greater than 400° C., to improve the purity of the carbon product.

A possible by-product in graphene syntheses are smaller graphitic fractions called polycyclic aromatic hydrocarbons (PAH). To name some: anthracene, benzo[a]pyrene, benzo[ghi]perylene, chrysene, corannulene, coronene, ovalene, pentacene, phenanthrene, pyrene, tetracene, triphenylene. Dependent on their size, these toxic, mostly cancerogenic compounds are either volatile or their lipophilicity is the main problem. These graphene-fractions have boiling or sublimation points below or around 400° C. which is why they cannot be found when the main product is filtered at this temperature.

CHARACTERISATION AND EXAMPLES

Synthesised graphene sheets produced using the above-described apparatus were applied directly to lacey carbon grids for analysis by transmission electron microscopy (TEM). A 200 kW FEI Tecnai G2 20 Twin TEM was used to characterise the graphene sheets. The graphene sheets were pressed into pellets in preparation for RAMAN analysis which was performed on a Renishaw Ramanscope-1000 fitted with a 633 HeNe laser.

In the following examples, references to power levels in kW refer to the microwave power level used to create the plasma in each nozzle.

Example 1: Using Nitrogen ($N_2$) as Buffer Gas and Pure Methane as Carbon Source and Associated TEM Analysis This example shows the influence of the parameters on flake size and thickness.

|   | Power | $N_2$ flow rate (L/min) | Methane ($CH_4$) flow rate (L/min) |
|---|---|---|---|
| A | 1.5 kW | 27 | 3 |
| B | 2 kW | 24 | 6 |
| C | 3 kW | 14 | 16 |

Figure 7:
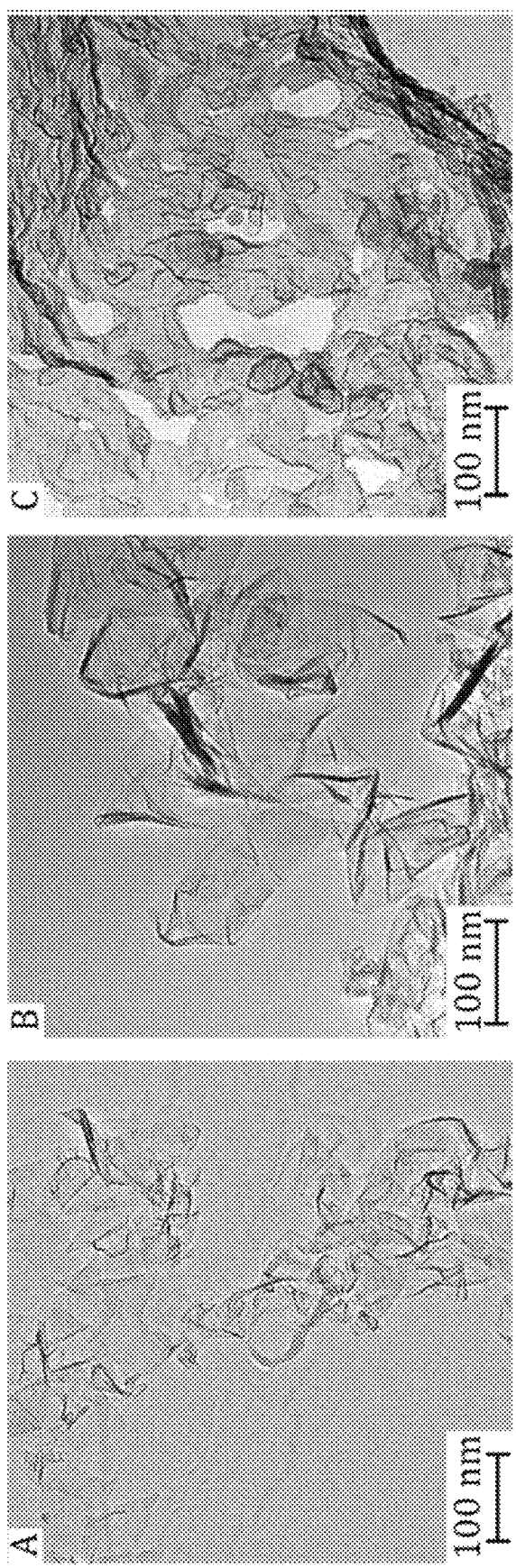
FIGS. 7 and 8 present transmission electron micrographs of synthesised graphitic carbon material.
Figure 8:
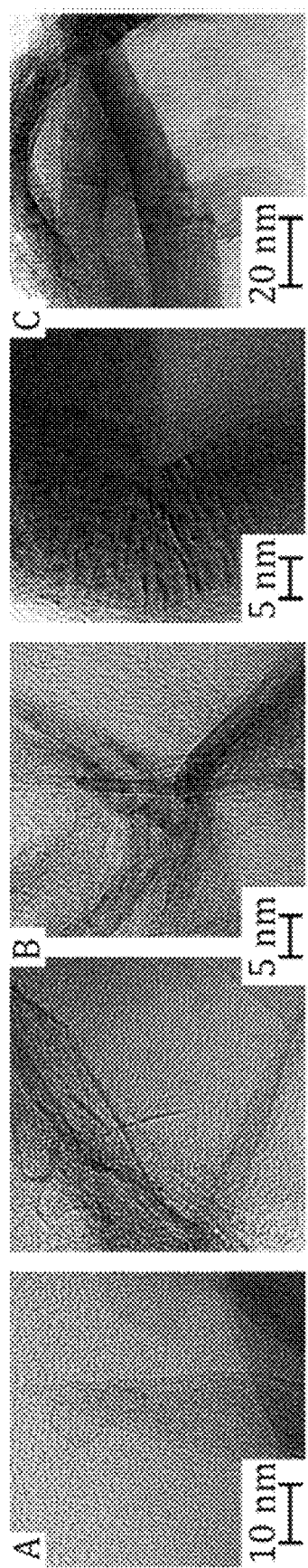

FIGS. 7 and 8 present transmission electron micrographs of graphitic carbon material synthesised using the above parameters. In each case, the material produced is characterised as follows:

A—Graphene and graphitic particles up to 150 nm in size, typically between 1-5 layers thick.
B—Graphene and graphitic particles up to 300 nm in size, typically between 1-12 layers thick.
C—Graphene and graphitic particles up to 1 µm in size, typically between 25-60 layers thick.

Example 2: Using Nitrogen ($N_2$) as Buffer Gas and Natural Gas as Carbon Source and Associated Analysis This example shows a sample characterised with several methods to show the graphene structure.

Figure 9:
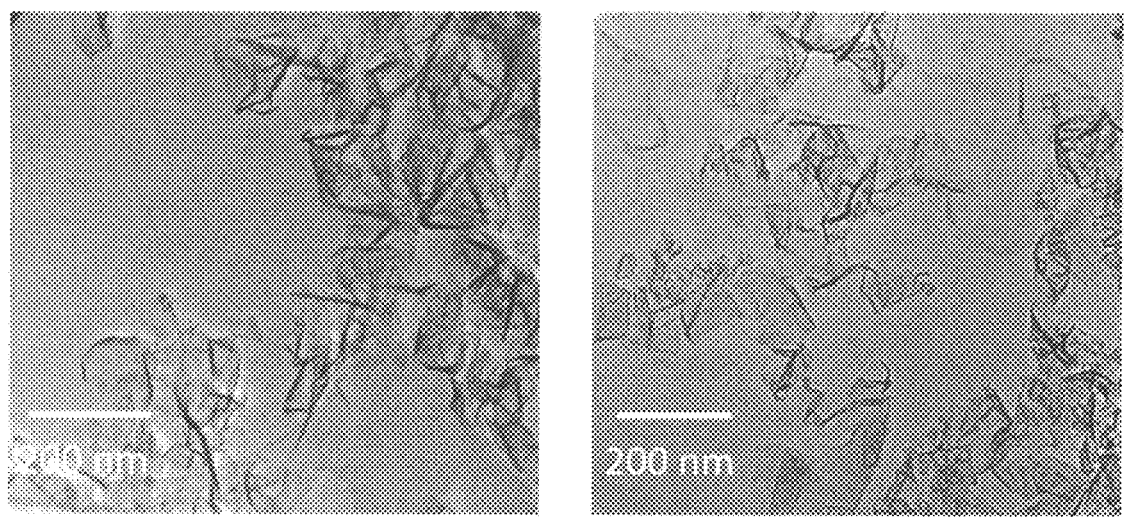
FIG. 9 presents transmission electron micrographs of graphitic carbon material synthesised at 2 kW microwave power, 24 L/min $N_2$+6 L/min mains natural gas (NG) flow rate.

FIG. 9 presents transmission electron micrographs of graphitic carbon material synthesised at 2 kW, 24 L/min $N_2$+6 L/min mains natural gas flow rate.

Figure 10:
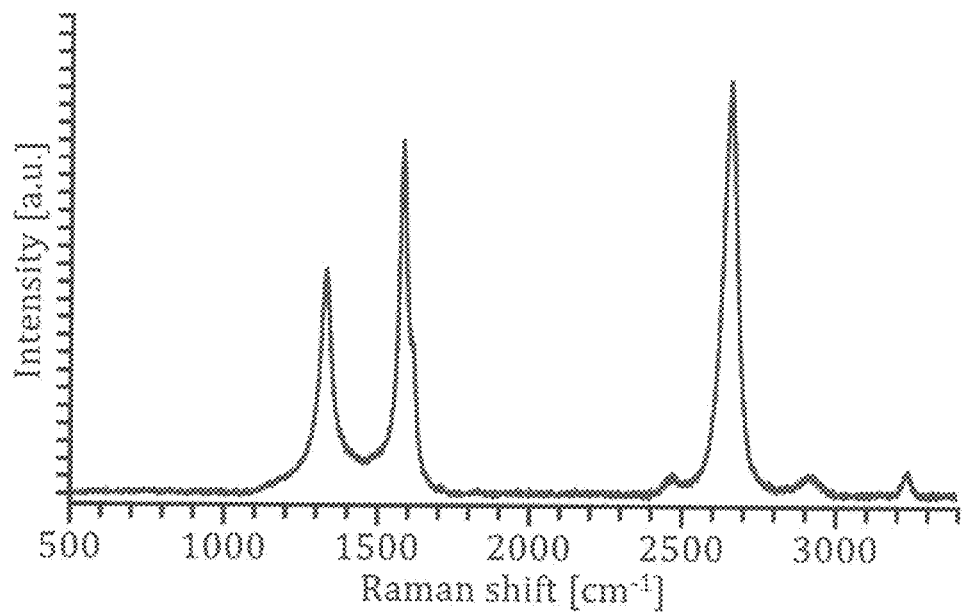
FIG. 10 presents a Raman spectrum of a graphitic carbon sample synthesised at 2 kW, 24 L/min $N_2$+6 L/min $CH_4$ flow rate.

FIG. 10 presents an example Raman spectrum of a graphitic carbon sample synthesised at 2 kW, 24 L/min $N_2$+6 L/min $CH_4$ flow rate.

Example 3: Role of Buffer Gas

Figure 11:
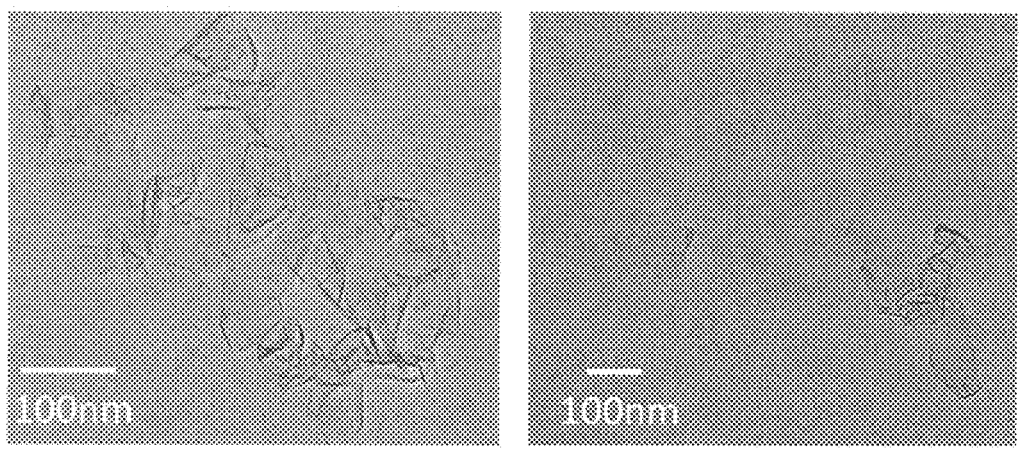
FIGS. 11-13 present further transmission electron micrographs of synthesised graphitic carbon material.
Figure 12:
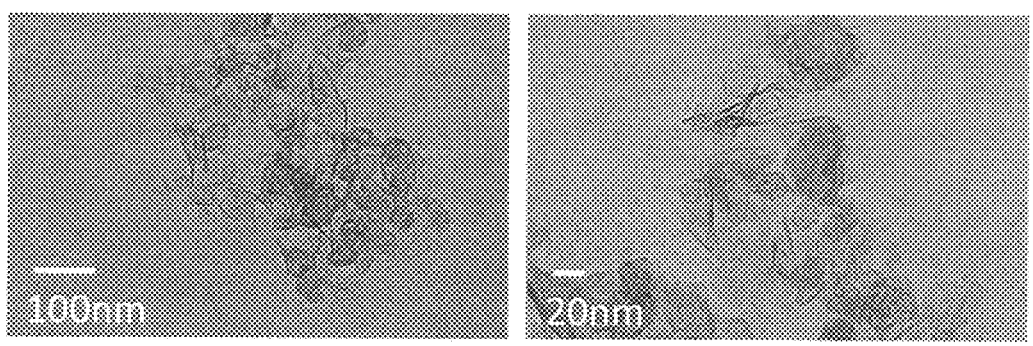
Figure 13:
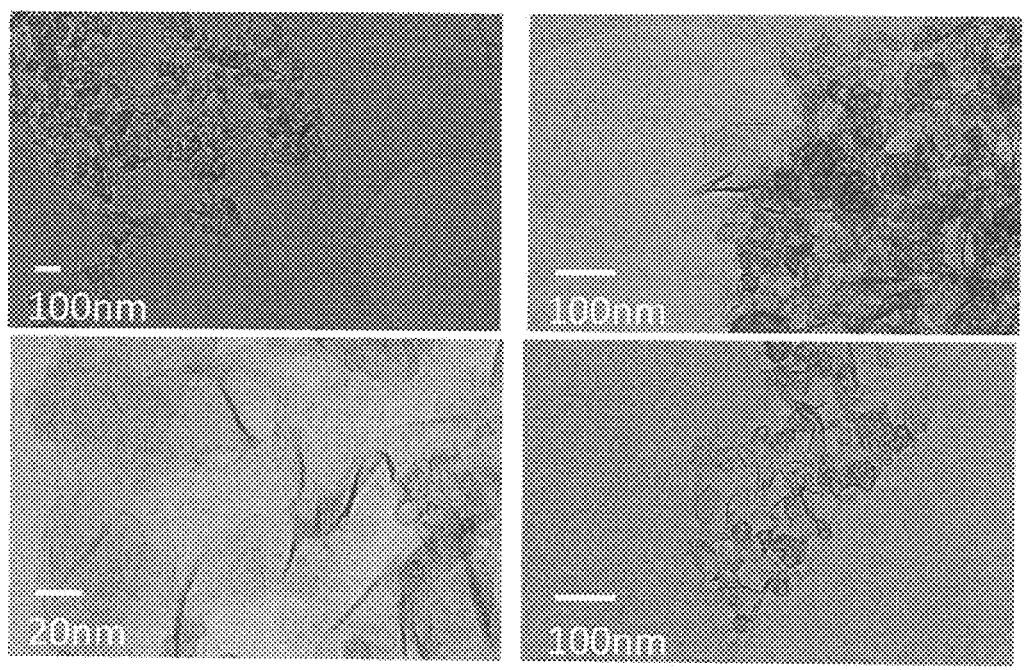

FIGS. 11-13 present transmission electron micrographs of graphitic carbon material produced using natural gas as the carbon source and argon as the buffer gas. The process parameters used to produce the carbon material were as follows:
FIG. 11—36 L/min Ar, 5.2 L/min NG, 5 kW, bag filter.
FIG. 12—15 L/min Ar, 22 L/min NG, 6 kW, HGF
FIG. 13—6 L/min Ar, 22 L/min NG, 6 kW, bag filter

Example 4: Experiments with $CO_2$ and Associated TEM Analysis

Figure 14:
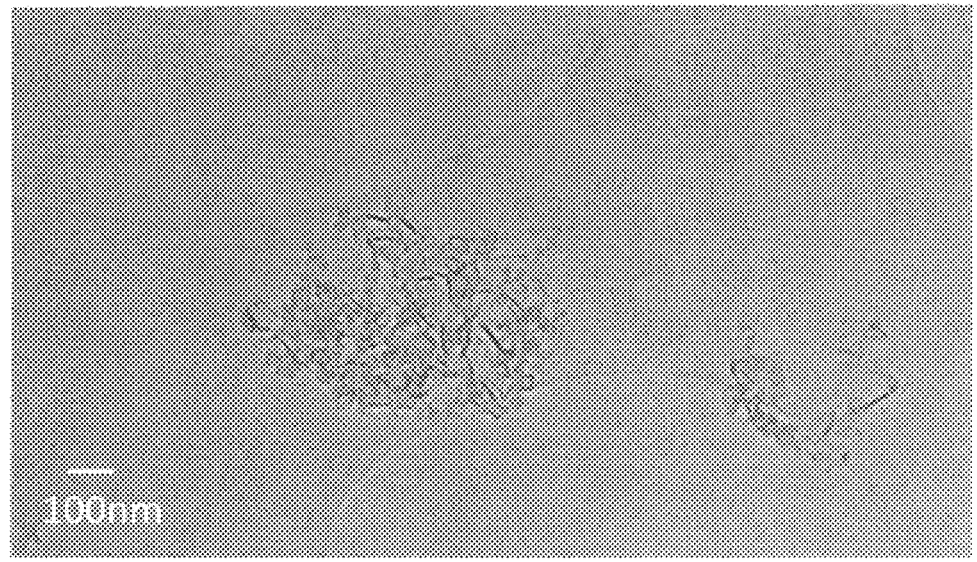
FIG. 14 presents TEM analysis of carbon materials synthesised at 6 kW, 21.5 L/min of Natural Gas, 5 L/min of $CO_2$.
Figure 14:
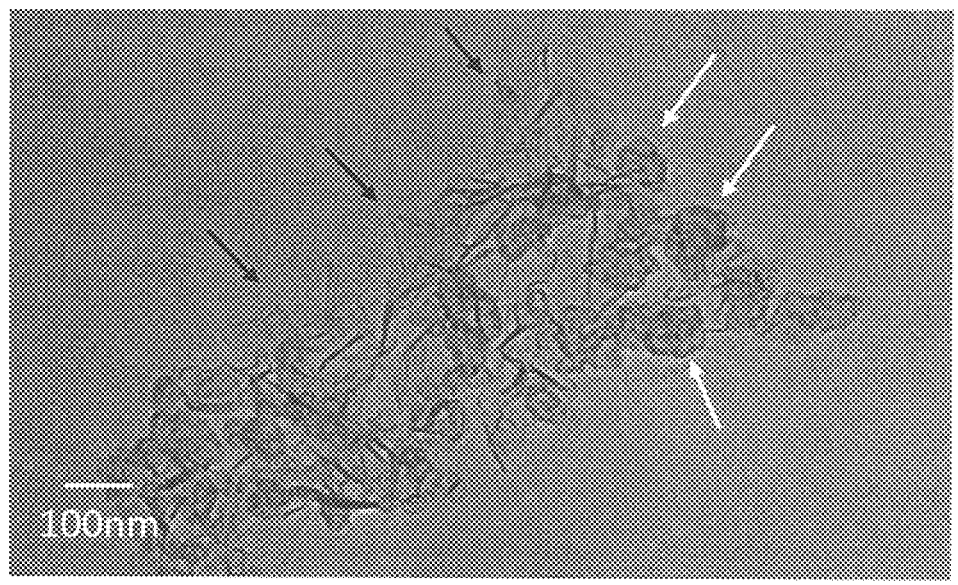

FIG. 14 presents TEM analysis of carbon materials synthesised at 6 kW, 21.5 L/min of Natural Gas, 5 L/min of $CO_2$. The white arrows indicate circular, onion-type particles which are potentially amorphous inclusions in the graphitic flakes (black arrows).

We have furthermore compared four cases in terms of TEM, Raman and conductivity to establish the following trends:

(1) Natural Gas (>70% $CH_4$) Vs Propane $C_3H_8$ in 30 L/Min He, 6 kW

It can be noted that this comparison is not possible in argon, since there is no stable plasma obtained from 30 L/min Ar+2.5 L/min $CH_4$ at 6 kW due to the distinctly different nature of an argon plasma when compared to natural gas, helium, argon, $CO_2$, or others. To compare similar carbon flow we stick with 7.2 L/min $CH_4$ and 2.5 L/min $C_3H_8$.

Figure 15:
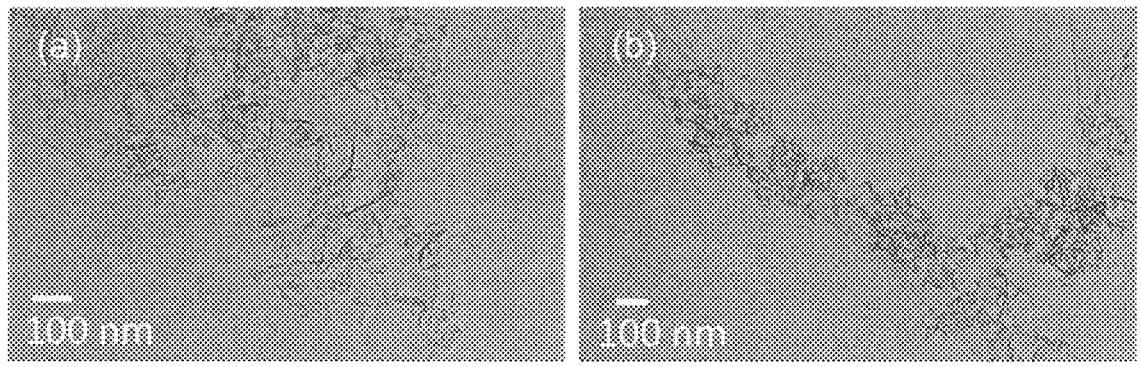
FIG. 15 presents further transmission electron micrographs of synthesised carbon materials.

FIG. 15 presents transmission electron micrographs of carbon materials synthesised under the following conditions:

(a) Natural gas at 7.2 L/min and 30 L/min helium as buffer gas subjected to 6 kW microwave power—slightly less wrinkly flakes in TEM. It was not possible to measure conductivity on this sample as no cohesive pellet could be obtained.

(b) Propane at 2.8 L/min and 30 L/min helium as buffer gas subjected to 6 kW microwave power shows marginally smaller flakes/more wrinkles. Its pellet conductivity could be obtained with 500 S/m.

Raman spectra were taken from thin films of graphene samples on quartz substrate on a Bruker Senterra Raman spectrometer with 633 nm laser 5 mW power, 50× objective, laser app. 500 µm, 10 accumulations of 2 s measurements.

Figure 16:
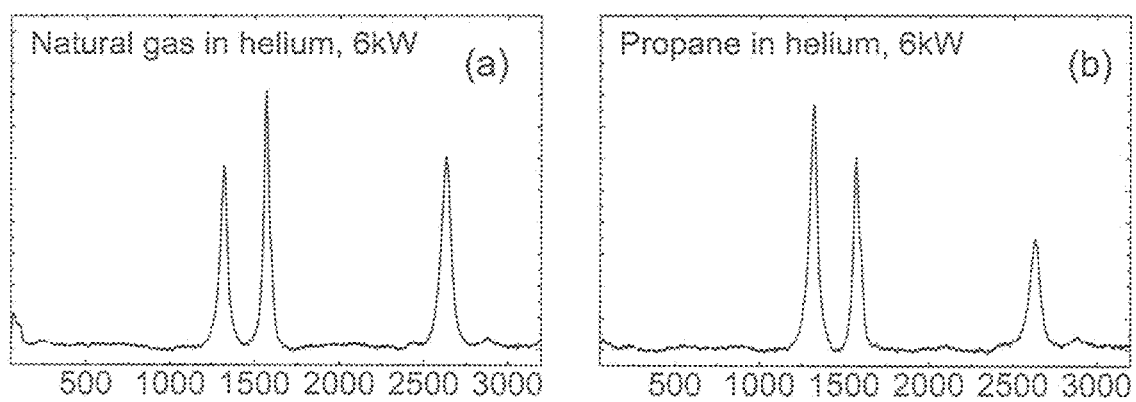
FIG. 16 presents Raman spectra of samples of carbon materials produced (in line with the TEM observations in FIG. 15) from (a) natural gas (7.2 L/min) in 30 L/min helium at 6 kW microwave power, and (b) propane (2.8 L/min) in helium (30 L/min) at 6 kW microwave power.

The Raman spectra of the graphene samples produced under conditions (a) and (b) above are shown in FIG. 16. The shown spectra have been baseline corrected.

Comparing the Raman spectra of natural gas and propane it is evident that both show the typical characteristics of a graphitic sample. The D peak (around 1320 $cm^{-1}$) indicates sp3 hybridised carbon, which could be amorphous impurities in the sample but according to TEM stems mainly from the edges of the flakes (flake size between 50-500 nm) observed by the laser beam (500 µm). It is enhanced with increasing number of edges under the beam, i.e. by smaller flake size. This way the increase in D/G ratio (0.71 for NG, 1.3 for propane) confirms the observation in TEM of a smaller flake sizes and higher defect density. The G/2D ratio is significant for layer determination. The G peak (around 1570 $cm^{-1}$) intensity increases with the number of layers, while the 2D peak (around 2630 $cm^{-1}$) shows the highest intensity for single layer graphene. The Raman spectra indicate fewer layers for the NG sample (G/2D 1.3, propane G/2D 1.7). The overall very poor intensity of the 2D peak can again be explained by the size of the flakes compared to the size of the beam. While we would expect much lower G/2D ratios for large area few layer graphene, it can be excluded that the present sample is composed of graphite as opposed to graphene by the single 2D peak.

(2) Low Natural Gas (3.6 L/Min) Vs High Natural Gas (7.2 L/Min) in 30 L/Min Ar, kW (First Set) and He, 6 kW (Second Set)

Here, lower carbon flows, i.e. higher level of dilution, is shown to result in better quality material in terms of conductivity: 5000 S/m vs 1500 S/m. Flakes are more dispersed and show fewer wrinkles in TEM at higher dilution. The methane cracking efficiency has been monitored via gas chromatographic analysis in a series of compositions of natural gas and argon.

| NG (L/min) | Ar (L/min) | Power (kw) | Natural gas cracked (L/min) |
|---|---|---|---|
| 25 | 5 | 6 | 18.0 |
| 20 | 10 | 6 | 15.3 |
| 15 | 15 | 6 | 12.7 |
| 10 | 20 | 6 | 9.5 |
| 5 | 25 | 5 | 4.9 |

Figure 17:
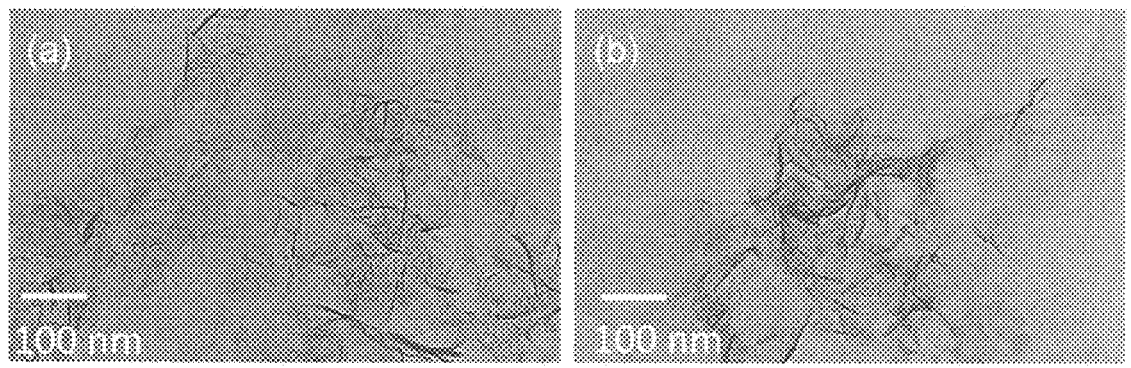
FIG. 17 presents further transmission electron micrographs of synthesised carbon materials.

FIG. 17 presents transmission electron micrographs of carbon materials synthesised under the following conditions:
(a) Low natural gas flows (3.6 L/min) and high dilution by Argon (30 L/min), 5 kW microwave power result in relatively flat and stretched out flakes of few layer graphene. Wrinkles are kept to a minimum and occur most likely due to insufficient dispersion upon TEM grid preparation.
(b) Higher natural gas flows (7.2 L/min) result in less transparent, i.e. more layered flakes, slightly more crumpled and smaller in size.

Figure 18:
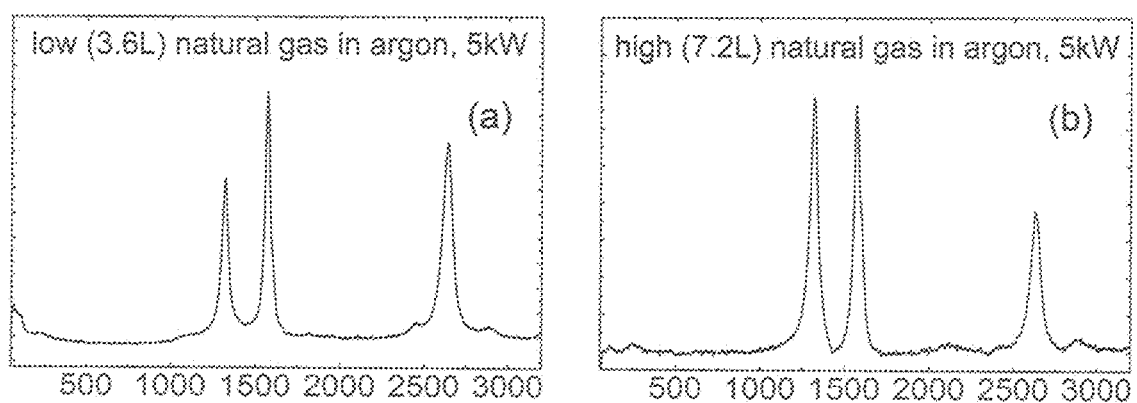
FIG. 18 presents Raman spectra of samples obtained for (a) Low NG (D/G 0.68, G/2D 1.2) vs (b) high NG (D/G 1.0, G/2D 1.8) flows in argon at 5 kW microwave power.

FIG. 18 presents Raman spectra of samples obtained for (a) Low NG (D/G 0.68, G/2D 1.2) vs (b) high NG (D/G 1.0, G/2D 1.8) flows in argon at 5 kW microwave power. In the captions of these and subsequent spectra, "L" is an abbreviated form of the flow rate in L/min, and "low" refers to a relatively low flow rate (3.6 L/min). "High" refers to a relatively high flow rate (7.2 L/min).

The Raman results indicate higher disorder (D/G) from higher NG flows (smaller flakes, more impurities) and more layers (G/2D).

(3) Low (3 kW) Vs. High (6 kW) Power on a System of 30 L/Min He with 3.6 L/min $CH_4$ Here, higher power is shown to yield better quality material (higher conductivity 2500 vs 4000 S/m, fewer layers, fewer wrinkles).

Figure 19:
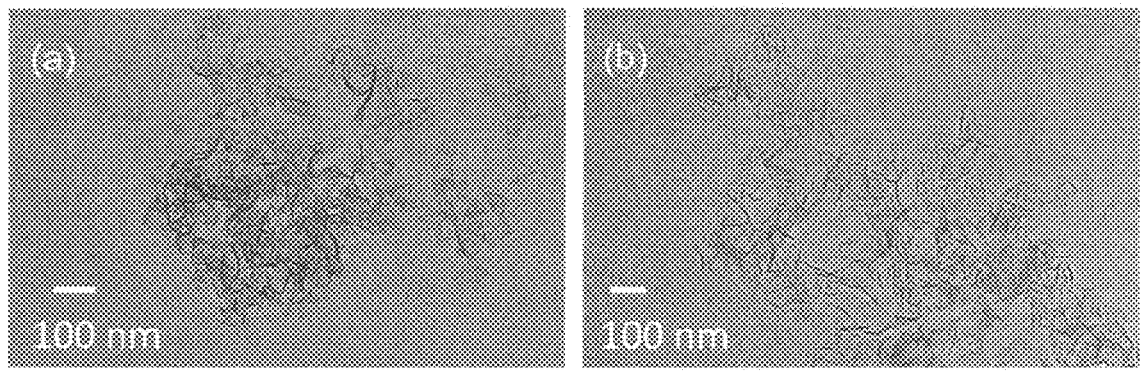
FIG. 19 presents further transmission electron micrographs of synthesised carbon materials.

FIG. 19 presents transmission electron micrographs of carbon materials synthesised under the following conditions:
(a) Material gained from 3.6 L/min natural gas in 30 L/min helium at 3 kW microwave power shows thicker agglomerations of fairly small graphitic flakes.
(b) Material gained at 6 kW microwave power from otherwise identical settings shows larger flakes of higher transparency, indicating fewer layers.

Figure 20:
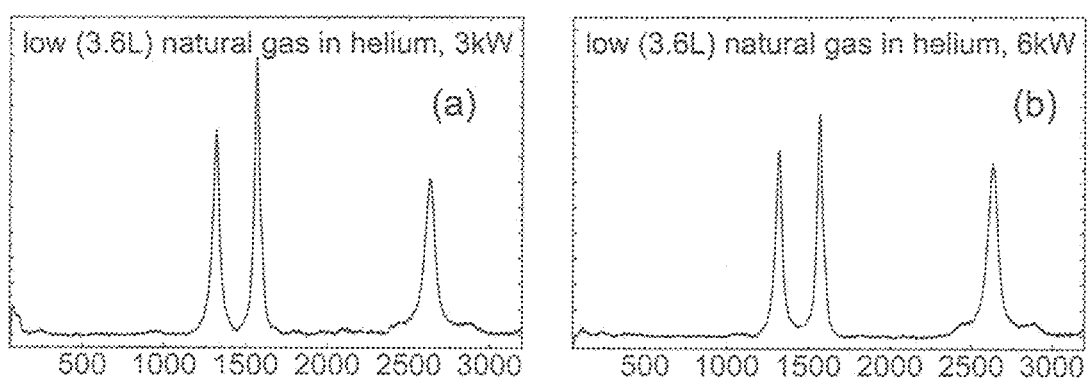
FIG. 20 presents Raman spectra of samples obtained using NG in helium for (a) 3 kW (D/G 0.73, G/2D 1.8) and (b) 6 kW (D/G 0.83, G/2D 1.3)

FIG. 20 presents Raman spectra of samples obtained using NG in helium for (a) 3 kW (D/G 0.73, G/2D 1.8) and (b) 6 kW (D/G 0.83, G/2D 1.3).

The Raman results indicate slightly larger flake size for higher power, definitely fewer layers (lower G peak intensity resulting in higher D/G ratio but also in significantly lower G/2D) in higher power sample.

(4) Comparison of Ar, He and $N_2$ as Buffer Gases to a 3.6 L/Min Natural Gas Flow in 6 kW or 5 kW Respectively where 6 kW was not Possible Here, comparison of various inert gases as buffers shows a significant difference in material gained. Argon as a buffer gas seems highly favourable when compared to helium. The larger size of fairly transparent flakes observed in TEM also results in significantly higher pellet conductivities.

Figure 21:
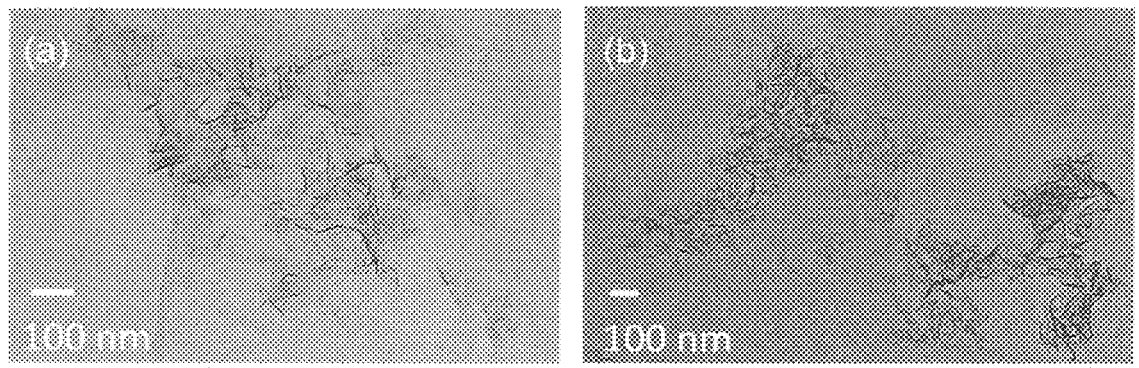
FIG. 21 presents further transmission electron micrographs of synthesised carbon materials.

FIG. 21 presents transmission electron micrographs of carbon materials synthesised under the following conditions:
(a) Ar (5 kW) 5100 S/m.
(b) He (5 kW) 2700 S/m more wrinkles, more layers.

Figure 22:
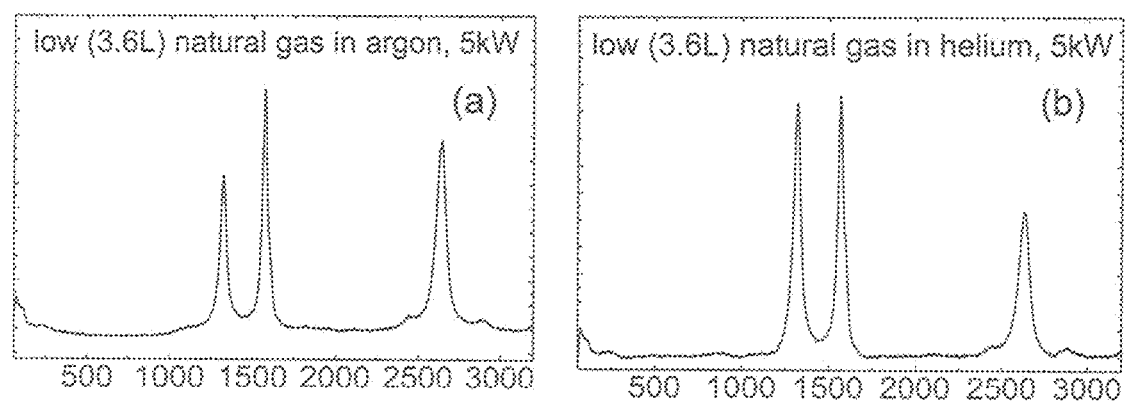
FIG. 22 presents Raman spectra of samples obtained using 3.6 U/min NG at kW in (a) argon (D/G 0.68, G/2D 1.2) and (b) helium (D/G 0.97, G/2D 1.8)

FIG. 22 presents Raman spectra of samples obtained using 3.6 L/min NG at kW in (a) argon (D/G 0.68, G/2D 1.2) and (b) helium (D/G 0.97, G/2D 1.8).

The Raman results indicate significantly larger flakes (lower D/G) with fewer layers (lower G/2D) where argon is applied as buffer gas, in good agreement with TEM.

Due to the nature of an argon plasma, it is not stably possible however to run these highly diluted settings of 3.6 L/min NG in 30 L/min Ar at 6 kW. As has been established in the previous example, higher power ratings result in better material though, so where possible we want to run high power experiments. This way, a helium experiment is compared to nitrogen, both 30 L/min inert gas, 3.6 L/min natural gas flow, 6 kW.

Figure 23:
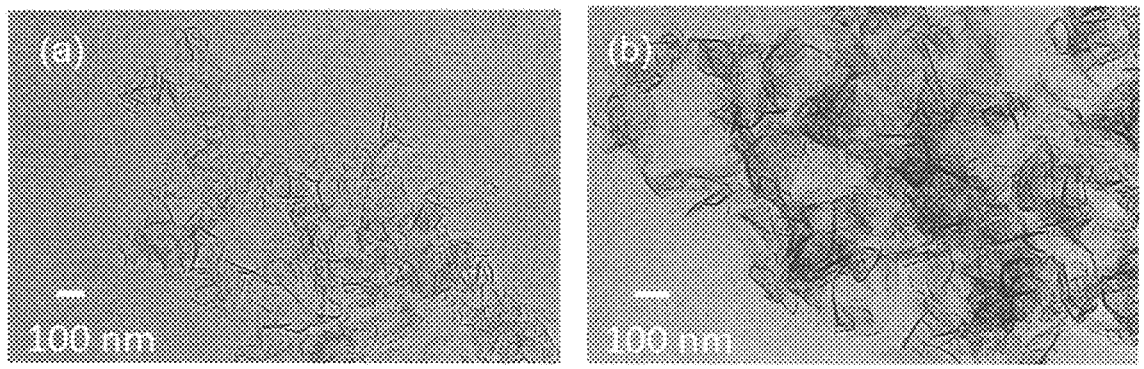
FIG. 23 presents further transmission electron micrographs of synthesised carbon materials.

FIG. 23 presents transmission electron micrographs of carbon materials synthesised under the following conditions:
(a) He (6 kW) 4100 S/m but fewer layers and fewer wrinkles.
(b) $N_2$ (6 kW) 5900 S/m.

The TEM reveals more transparent flakes from the helium setting. Both samples show wrinkles and only insignificant amounts of non-graphitic material (by-products). Pellet conductivities were determined with 4 vs 6 kS/m, slightly better for the nitrogen sample.

Figure 24:
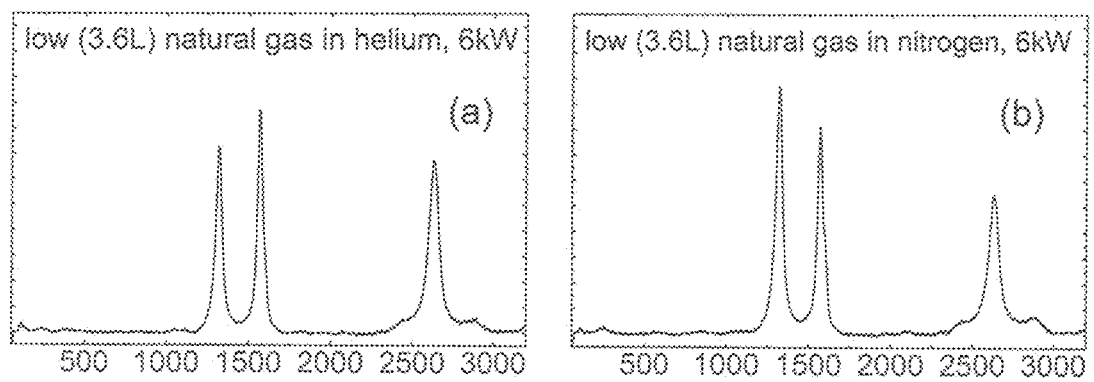
FIG. 24 presents Raman spectra of samples obtained using 3.6 L/min NG at 6 kW in (a) helium (D/G 0.83, G/2D 1.3) and (b) nitrogen (D/G 1.2, G/2D 1.5)

FIG. 24 presents Raman spectra of samples obtained using 3.6 L/min NG at 6 kW in (a) helium (D/G 0.83, G/2D 1.3) and (b) nitrogen (D/G 1.2, G/2D 1.5).

The Raman spectroscopy shows larger flakes (fewer defects, D/G) and lower number of layers (G/2D) than the nitrogen sample. The high defect density in the nitrogen sample (D/G) might also indicate doping of the flakes by potential incorporation of nitrogen into the graphene lattice or even non-covalent bonding of nitrogen species to the graphene platelet powder. This would also explain the higher conductivity observed in the nitrogen sample.

Further possible modifications and alternative embodiments Detailed embodiments have been described above, together with some possible modifications and alternatives. As those skilled in the art will appreciate, a number of additional modifications and alternatives can be made to the above embodiments whilst still benefiting from the inventions embodied therein.

Figure 26:
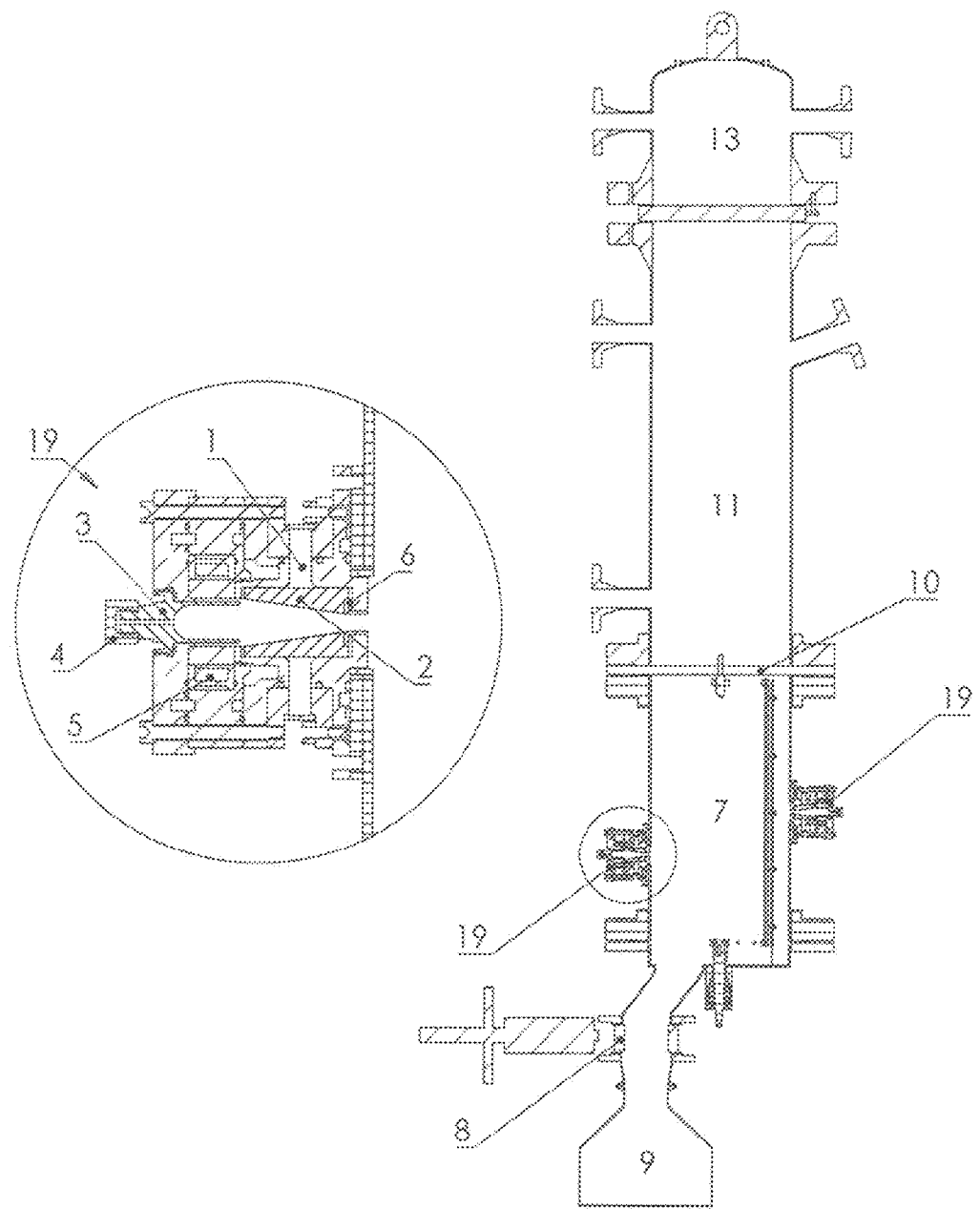
FIG. 26 illustrates an example of alternative apparatus for the plasma synthesis of graphitic products including graphene.

As an example of alternative apparatus for the plasma synthesis of graphitic products including graphene, FIG. 26 shows a twin plasma system that combines two microwave plasma nozzles 19 into a single reaction chamber 7. Each of the nozzles 19 bisects a waveguide 1 which carries the microwave energy source through a low dielectric material 2 that acts to confine a carbon-containing gas flow and hold the plasma. The gas flow is rotated in a vortex motion by passing through multiple tangential slots 5. This flow is further stabilised by a vortex finder 3, before passing across the microwave field within the dielectric tube 2 where it is cracked by a non-equilibrium plasma before entering the reaction chamber volume 7. The nozzle features a removable cap 4 for access, to ignite the plasma, and high temperature gaskets 6 to seal the dielectric material to the metal nozzle parts.

Once the gas flow has entered the chamber 7, it passes up towards a filter vessel 11 where the solid carbon materials (including graphene) are separated from the gaseous materials with metal filter candles. The gaseous materials pass into the top of the filter vessel 13 while the solid material is continuously removed from the candles with reverse jet gas flows. The solid material then falls down through the body of the filter 11 and chamber 7 before collected onto the body face of the reaction chamber. A mechanical scraper mechanism 10 rotates around the interior of the reaction vessel 7 to continuously remove carbon build up. The carbon is pushed by the scraper mechanism 10 towards an orifice at the base of the reaction chamber 7 and passes through a valve 8 before entering the collection vessel 9 at the base of the process. The valve 8 enables the system to be closed from the collection vessel 9 so that vessel can be emptied during operation of the process.

The system of FIG. 26 involves an alternative process design to that of FIG. 1. In FIG. 26 the integration of the chamber and the filter body enable superior carbon removal from the system. This in turn results in better product uniformity and quality. The carbon removal system 10 within the chamber 7 of FIG. 26 also enables a reduction in gas consumption of the nozzles whilst producing the same volume of solid material, as gas is no longer required to keep the solid material away from the nozzle 19/reactor 7 interface.

REFERENCES

[1] K. S. Novoselov et al., Nature 490 (2012) 192, A roadmap for graphene.
[2] M. Segal, Nature Nanotechnology 4 (2009) 612, Selling graphene by the ton.
[3] K. S. Subrahmanyam et al., The Journal of Physical Chemistry C 113 (2009) 4257, Simple method of preparing graphene flakes by an arc-discharge method.
[4] Y. Chen et al., Chemical Physics Letters 538 (2012) 72, Mass-production of highly-crystalline few-layer graphene sheets by arc discharge in various $H_2$-inert gas mixtures.
[5] J. L. Meunier et al., 21st International Symposium on Plasma Chemistry (2013), Homogeneous nucleation of graphene nanoflakes (GNFs) in thermal plasma: Tuning the 2D nanoscale geometry.
[6] Y. Anekawa et al., 21st International Symposium on Plasma Chemistry (2013), Synthesis of graphene-based conductive thin films by plasma-enhanced chemical vapor deposition in a CO/H2 microwave discharge system.
[7] Tatarova E. et al., Applied Physics Letters 103 (2013) 134101, Microwave plasma based single step method for free standing graphene synthesis at atmospheric conditions.
[8] A. Dato et al., Chemical Communications (2009) 6095, Clean and highly ordered graphene synthesised in the gas phase.
[9] Novoselov K. S. et al., Science 306 (2004) 666, Electric field effect in atomically thin carbon films.
[10] Castelain M. et al., Chemical Communications 47 (2011) 7677, Supramolecular assembly of graphene with functionalized poly(fluorene-alt-phenylene): the role of the anthraquinone pendant groups.
[11] Yan X. et al., Journal of Materials Chemistry 21 (2011) 3295, Solution-chemistry approach to graphene nanostructures.
[12] Emstev K. et al., Nature Materials 8 (2009) 203, Towards wafer-size graphene layers by atmospheric pressure graphitization of silicon carbide.
[13] Wurstbauer U. et al., Carbon 50 (2012) 4822, Molecular beam growth of graphene nanocrystals on dielectric substrates.
[14] Dhar S. et al., AIP Advances 1 (2011) 022109, A new route to graphene layers by selective laser ablation.
[15] McAllister M. J. et al., Chemistry of Materials 19 (2007) 4396, Single sheet functionalized graphene by oxidation and thermal expansion of graphite.
[16] Vlassiouk I. et al., Carbon 54 (2013) 58, Large scale atmospheric pressure chemical vapor deposition of graphene.
[17] Reina A. et al., Nano Letters 9 (2009) 30, Large area, few-layer graphene films on arbitrary substrates by chemical vapor deposition.
[18] Angstron Materials; Vorbeck Materials in Jessup, Md.; XG Sciences in East Lansing, Mich.
[19] Hernandez Y et al., Nanotechnology 3 (2008) 563, High-yield production of graphene by liquid-phase exfoliation of graphite.
[20] Dato A. et al., New Journal of Physics 12 (2010) 125013, Substrate-free microwave synthesis of graphene: experimental conditions and hydrocarbon precursors.

The invention claimed is:

1. A method of synthesizing graphitic products including graphene, the method comprising:
supplying a process gas to a plasma nozzle that is coupled to a reaction chamber, the process gas comprising a carbon-containing species;
supplying radio frequency radiation to the process gas within the plasma nozzle, so as to produce a non-equilibrium plasma within the plasma nozzle, and passing the process gas through a radio frequency radiation field within the plasma nozzle, to thereby cause cracking of the carbon-containing species within the plasma nozzle, wherein the radio frequency radiation comprises microwave radiation;
forming multiple vortices in the process gas within the plasma nozzle and subjecting the multiple vortices to the microwave radiation;
wherein the plasma nozzle is arranged such that an afterglow of the plasma extends into the reaction chamber, the cracked carbon-containing species also passes into the reaction chamber, and the cracked carbon-containing species recombines within the afterglow, so as to form the graphitic products including the graphene;
applying cooling to the afterglow on exiting the plasma nozzle, wherein the cooling comprises one of water cooling or gas cooling;
subjecting the reaction chamber to gas filtration to collect solid carbon from the gas phase, wherein the gas filtration is performed using a gas filtration system that is attached above the reaction chamber and comprises an elongate chamber comprising one or more filter candles; and
blowing gas through the elongate chamber to dislodge the graphitic products collected by the one or more filter candles as a result of the gas filtration, to cause the graphitic products collected by the one or more filter candles to fall down, through the reaction chamber, for extraction through an exit at the bottom of the reaction chamber.

2. The method according to claim 1, further comprising generating the plasma at substantially atmospheric pressure.

3. The method according to claim 1, wherein the carbon-containing species comprises one of natural gas, $CH_4$, $C_2H_6$, $C_2H_4$, $C_3H_8$ or $C_4H_{10}$.

4. The method according to claim 1, wherein the process gas further comprises a buffer gas, the buffer gas comprising one of argon, nitrogen, or helium; and
   wherein the ratio of carbon-containing species to buffer gas in the process gas is 50:50 or less; or around 20:80.

5. The method according to claim 1, wherein the process gas further comprises a buffer gas, the buffer gas comprising carbon dioxide.

6. The method according to claim 1, wherein the afterglow within the reaction chamber has an operating temperature of lower than 3500° C., lower than 1000° C., or around 300° C.; and
   wherein the temperature outside the plasma nozzle, at the carbon formation point within the afterglow, is in the range of 800° C. to 1200° C.

7. The method according to claim 1, further comprising delivering gas around an interface between the plasma nozzle and the reaction chamber.

8. The method according to claim 1, further comprising extracting the graphitic products using a continuous extraction process.

9. The method according to claim 1, wherein the carbon-containing species is cracked without the process gas being introduced into a thermal zone;
   wherein no catalyst is used in forming the graphitic products; and
   wherein no external heating is applied during the formation of the graphitic products.

* * * * *